US008498417B1

(12) United States Patent
Harwood et al.

(10) Patent No.: US 8,498,417 B1
(45) Date of Patent: Jul. 30, 2013

(54) AUTOMATION OF COORDINATION OF ENCRYPTION KEYS IN A SAN BASED ENVIRONMENT WHERE AN ENCRYPTION ENGINE, DEVICE MANAGEMENT, AND KEY MANAGEMENT ARE NOT CO-LOCATED

(75) Inventors: John S. Harwood, Paxton, MA (US); Joshua A. Rosenthol, Westford, MA (US); Robert W. Griffin, Hollis, NH (US); John T. Fitzgerald, Mansfield, MA (US); Thomas E. Linnell, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 1476 days.

(21) Appl. No.: 12/043,898

(22) Filed: Mar. 6, 2008

Related U.S. Application Data

(60) Provisional application No. 61/017,144, filed on Dec. 27, 2007.

(51) Int. Cl.
*H04L 29/06* (2006.01)
(52) U.S. Cl.
USPC ............................ 380/277; 380/286; 713/193
(58) Field of Classification Search
USPC .................. 380/44, 264, 277, 278, 279, 280, 380/281, 282; 713/153, 164, 165, 193
See application file for complete search history.

(56) References Cited

U.S. PATENT DOCUMENTS

| 5,206,939 | A | 4/1993 | Yanai et al. |
| 5,604,800 | A | 2/1997 | Johnson et al. |
| 5,931,947 | A | * | 8/1999 | Burns et al. ....................... 726/4 |
| 6,044,468 | A | | 3/2000 | Osmond |
| 6,061,770 | A | * | 5/2000 | Franklin ....................... 711/162 |
| 6,076,148 | A | | 6/2000 | Kedem |
| 6,209,059 | B1 | | 3/2001 | Ofer et al. |
| 6,493,825 | B1 | | 12/2002 | Blumenau et al. |
| 6,502,205 | B1 | | 12/2002 | Yanai et al. |
| 6,792,518 | B2 | | 9/2004 | Armangau et al. |
| 6,842,810 | B1 | | 1/2005 | Fitzgerald et al. |
| 6,976,165 | B1 | | 12/2005 | Carpentier et al. |
| 7,010,620 | B1 | | 3/2006 | Harwood et al. |
| 7,082,100 | B2 | | 7/2006 | Linnell et al. |
| 7,093,021 | B2 | | 8/2006 | Blumenau et al. |

(Continued)

OTHER PUBLICATIONS

Menezes et al., Handbook of Applied Cryptography, Oct. 17, 1996, pp. 387, 400-402, CRC Press, New York, NY.

(Continued)

*Primary Examiner* — Eleni Shiferaw
*Assistant Examiner* — Hilary Branske
(74) *Attorney, Agent, or Firm* — Richard Auchterlonie; Novak Druce Connolly Bove + Quigg LLP

(57) ABSTRACT

A key management server in a storage area network (SAN) provides encryption keys for source and destination storage objects and also associates destination storage objects with source storage objects. When a source object is to be replicated, a replication facility in a storage system of a new destination object requests the key management server to associate the destination object with the source object and assign the data encryption key of the source object or a new data encryption key to the destination object. For recovery of the source object, a replication facility in the storage system of the source object obtains information from the key management server about the replica associated with the source object for replicating data from the destination object back to the source object.

19 Claims, 19 Drawing Sheets

U.S. PATENT DOCUMENTS

| | | | |
|---|---|---|---|
| 7,165,152 | B2 | 1/2007 | Blumenau et al. |
| 7,260,636 | B2 | 8/2007 | Blumenau et al. |
| 7,272,727 | B2* | 9/2007 | Mimatsu ............... 713/193 |
| 7,458,102 | B2 | 11/2008 | Rogers et al. |
| 7,475,124 | B2 | 1/2009 | Jiang et al. |
| 7,627,756 | B2 | 12/2009 | Fujibayashi et al. |
| 7,716,180 | B2 | 5/2010 | Vermeulen et al. |
| 2003/0046238 | A1 | 3/2003 | Nonaka et al. |
| 2003/0046572 | A1 | 3/2003 | Newman et al. |
| 2003/0115324 | A1 | 6/2003 | Blumenau et al. |
| 2005/0013441 | A1* | 1/2005 | Klein ............... 380/278 |
| 2005/0065986 | A1 | 3/2005 | Bixby et al. |
| 2005/0226059 | A1* | 10/2005 | Kavuri et al. ........... 365/189.05 |
| 2006/0005048 | A1* | 1/2006 | Osaki et al. ............. 713/193 |
| 2006/0018484 | A1 | 1/2006 | Yoshihiro et al. |
| 2006/0062383 | A1* | 3/2006 | Kaneda et al. ............. 380/28 |
| 2006/0085636 | A1* | 4/2006 | Osaki ............... 713/165 |
| 2007/0083657 | A1 | 4/2007 | Blumenau et al. |
| 2007/0116287 | A1 | 5/2007 | Rasizade et al. |
| 2007/0179934 | A1 | 8/2007 | Basov et al. |
| 2007/0179990 | A1 | 8/2007 | Zimran et al. |
| 2007/0180239 | A1* | 8/2007 | Fujibayashi et al. .......... 713/165 |
| 2008/0082835 | A1* | 4/2008 | Asher et al. ............. 713/193 |
| 2008/0219449 | A1* | 9/2008 | Ball et al. ............. 380/277 |

OTHER PUBLICATIONS

Patterson, et al., Introduction to Redundant Arrays of Inexpensive Disks (RAID), Spring CompCon 89, Feb. 27-Mar. 3, 1989, pp. 112-117, IEEE Computer Society, IEEE, New York, NY.

"Introducing RAID 5 on Symmetrix DMX," EMC White Paper, Jan. 19, 2004, 12 pages, EMC Corporation, Hopkinton, MA.

"Enginuity: The Symmetrix Storage Operating Environment," EMC White Paper, 2005, 21 pages, EMC Corporation, Hopkinton, MA.

"EMC Symmetrix DMX Architecture," Product Description Guide, 2004, 76 pages, EMC Corporation, Hopkinton, MA.

Symmetrix 8000 Enterprise Storage Systems Product Description Guide, Mar. 2001, 46 pages, EMC Corporation, Hopkinton, MA.

"EMC CLARiiON CX3 Best Practices for Achieving "Five 9s" Availability," Feb. 2007, 14 pages, EMC Corporation, Hopkinton, MA.

Gobioff, et al, "Security for Network Attached Storage Devices," CMU-CS-97-185, Oct. 23, 1997, 20 pages, School of Computer Science, Carnegie Mellon University, Pittsburg, Pennsylvania.

Gibson, et al., "Filesystems for Network-Attached Secure Disks," CMU-CS-97-118, Jul. 1997, 18 pages, School of Computer Science, Carnegie Mellon University, Pittsburg, Pennsylvania.

Gibson, et al., "File Server Scaling with Network-Attached Secure Disks," Proceedings of the ACM International Conference on Measurement and Modeling of Computer Systems (Sigmetrics '97), Seattle, Washington, Jun. 15-18, 1997, p. 272-284, Association for Computing Machinery, New York, NY.

Gibson, et al., "A Case for Network-Attached Secure Disks," CMU-CS-96-142, Sep. 26, 1996, 19 pages, School of Computer Science, Carnegie Mellon University, Pittsburg, Pennsylvania.

Gong. Li, A Security Identity-Based Capability System, Jan. 1989, 16 pages, University of Cambridge Computer Laboratory, Cambridge, England.

IEEE P1619.3(TM)/D1, Draft Standard for Key Management Infrastructure for Cryptographic Protection of Stored Data ( May 2007), 44 pages, IEEE, Piscataway, NJ.

IEEE P1619.1(TM)/D16 Standard for Cryptographic Protection of Data on Block-Oriented Storage Devices (May 2007), IEEE, Piscataway, NJ.

IEEE P1619(TM)/D20 Draft Standard for Authenticated Encryption with Length Expansion for Storage Devices (Jun. 2007), 38 pages, IEEE, Piscataway, NJ.

FIPS Publication 197, Announcing the Advanced Encryption Standard (AES), Nov. 26, 2001, 51 pages, National Institute of Standards and Technology, Gaithersburg, MD.

FIPS Publication 140-2, Security Requirements for Cryptographic Modules, May 25, 2001, 69 pages, National Institute of Standards and Technology, Gaithersburg, MD.

FIPS Publication 198, The Keyed-Hash Message Authentication Code (HMAC), Mar. 6, 2002, 20 pages, National Institute of Standards and Technology, Gaithersburg, MD.

Network Working Group, G. Waters, Editor, "User-based Security Model for SNMPv2," RFC 1910, Feb. 1996, 40 pages, The Internet Society, Reston, VA.

IEEE Project 1619.1 Home, Project Authorization Request (PAR), Standard for Authenticated Encryption with Length Expansion for Storage Devices, internet status page printed Nov. 27, 2007, 3 pages, IEEE, Piscataway, NJ.

IEEE P1619(TM)/D19 Draft Standard for Cryptographic Protection of Data on Block-Oriented Storage Devices (Oct. 2007), IEEE, Piscataway, NJ.

GXC3 Core, P1619 / 802.1ae (MACSec) GCM/XTS/CBC-AES Core, ipcores.com datasheet, Nov. 2007, 3 pages, IP Cores, Inc., Palo Alto, CA.

* cited by examiner

| KEY STORE {66} | | | | | |
|---|---|---|---|---|---|
| DOMAIN NAME | OBJECT ID | KEY UUID | WRAPPED KEY INFO. | KEY POLICY | KEY SET POINTER |
| EMC98765 | 12345 | 7890 | --------- | ---- | --------- |
| | | | | | |
| | | | | | |
| - - - | - - - | - - - | - - - | - - - | - - - |

AUTOMATION OF COORDINATION OF ENCRYPTION KEYS IN A SAN BASED ENVIRONMENT WHERE AN ENCRYPTION ENGINE, DEVICE MANAGEMENT, AND KEY MANAGEMENT ARE NOT CO-LOCATED

RELATED APPLICATIONS

This application claims the benefit of John S. Harwood et al., U.S. Provisional Application Ser. 61/017,144 filed 27 Dec. 2007, entitled Automation of Coordination of Encryption Keys in a SAN Based Environment Where An Encryption Engine, Device Management, and Key Management are Not Co-Located, incorporated herein by reference.

FIELD OF THE INVENTION

The present invention relates to a storage system that stores data in encrypted form.

BACKGROUND OF THE INVENTION

Storage of data in encrypted form has often been used to preserve secrecy of highly classified government data. More recently there has been an increasing need for businesses to preserve sensitive customer data such as trade secrets, credit card numbers, and medical records. Storage of encrypted data on a data storage device such as a disk drive not only protects against theft of information if the data storage device is stolen, but also protects against inadvertent disclosure if the data storage device is not erased when it is re-configured for another user or retired from service.

A number of encryption techniques have been standardized, and some have been designed for encrypting stored data. One well-known standard encryption technique is the Advanced Encryption Standard (AES) described in the Federal Information Processing Standards (FIPS) Publication 197 published Nov. 26, 2001, by the United States National Institute of Standards and Technology (NIST), Gaithersburg, Md. AES uses a symmetric cryptographic key of 128, 192, or 256 bits to encrypt and decrypt data in blocks of 128 bits.

To encrypt a string of plaintext blocks, a selected encryption mode is layered over AES. Standard encryption modes often layered over AES include the Cipher Block Chaining (CBC) mode, and the XTS mode.

In CBC mode, each plaintext block is exclusive-OR'd with the previous ciphertext block before the plaintext block is encrypted. The first plaintext block in the string is exclusive-OR'd with a pre-selected initialization vector. Decryption is a reverse of this process.

The XTS mode has been designed for encrypting data stored on disk or tape. The XTS mode is described in the Institute for Electrical and Electronic Engineers (IEEE) P1619/D16 Standard for Cryptographic Protection of Data on Block-Oriented Storage Devices (May 2007), IEEE, Piscataway, N.J. In addition to the encryption key used by the AES block cipher, XTS layered over AES (XTS-AES) uses a "tweak key" to incorporate the logical position of the data block into the encryption. XTS-AES addresses threats such as copy-and-paste and dictionary attacks, while allowing parallelization and pipelining in cipher implementations.

Encryption of data for storage and decryption of data upon recall from storage requires some additional data processing resources. More troubling is the fact that encryption affects the reliability of data storage. Use of an improper key during encryption or loss of the proper key for decryption will cause the data to become unavailable or lost. Encryption may also interfere with standard methods of checking and testing data integrity.

To avoid using corrupted keys, some measures should be taken to verify the integrity of the keys in use. One method for ensuring key integrity is by using a "key signature." For example, this could be a Keyed-Hash Message Authentication Code (HMAC) computed over the cipher key using some higher-level key. In a similar fashion, the integrity of the stored ciphertext can be verified by using a HMAC key to compute a Message Authentication Code (MAC) over the ciphertext, and by storing the MAC with the ciphertext so that the MAC can be verified upon recall of the stored ciphertext. These integrity verification techniques are described in the IEEE P1619.1/D20 Draft Standard for Authenticated Encryption with Length Expansion for Storage Devices (June 2007), IEEE, Piscataway, N.J., and the IEEE P1619.3/D1, Draft Standard for Key Management Infrastructure for Cryptographic Protection of Stored Data (May 2007), IEEE, Piscataway, N.J. The HMAC is further described in FIPS Publication 198, The Keyed-Hash Message Authentication Code (HMAC), Mar. 6, 2002, National Institute of Standards and Technology, Gaithersburg, Md.

SUMMARY OF THE INVENTION

In accordance with one aspect, the invention provides a method of operation in a data processing system including a storage area network and a key management server for providing data encryption keys to the storage area network. The storage area network includes data storage devices, a replication engine separate from the data storage devices, and a replication facility. The method includes creating an encrypted storage object in the storage area network, and the key server assigning a data encryption key to the storage object and keeping a record of the data encryption key assigned to the storage object. The method further includes creating a replica of the storage object in the storage area network, and the key management server assigning a data encryption key to the replica in coordination with the replication facility independent of the encryption engine, and the key server keeping a record of the data encryption key assigned to the replica and an association of the replica with the storage object. The method further includes responding to a failure of the storage object in the storage area network by obtaining from the key management server an identification of the replica of the storage object that is associated with the storage object, and using the identification of the replica from the key management server to find the replica in the storage area network, and using the replica found in the storage area network to recover from the failure of the storage object.

In accordance with another aspect, the invention provides a method of operation in a data processing system including a storage area network and a key management server for providing data encryption keys to the storage area network. The method includes the key management server providing a data encryption key to the storage area network for encrypting data written to a source storage object in the storage area network, and the key management server keeping a record of the source storage object and the data encryption key for the source storage object. The method also includes the key management server providing a data encryption key to the storage area network for decrypting data read from the source storage object and written to a destination storage object in the storage area network, and the key management server keeping a record of the destination storage object and the data encryption key for the destination storage object and keeping an association of the record of the destination storage object with the record of the source storage object. The method further includes the storage area network responding to a failure of the source storage object by sending a request to the key management server, the request specifying the source storage object and requesting the key server to identify any storage object associated with the specified storage object, and in response to the request, the key management server finding that the record of the destination storage object is associated with the record of the specified source storage object, and returning a reply to the storage area network, the reply identifying the destination storage object. The method further includes the storage area network responding to the reply from the key management server by reading data from the destination storage object identified by the reply, and using the data read from the destination storage object identified by the reply to recover from the failure of the source storage object.

In accordance with yet another aspect, the invention provides a data processing system including a storage area network, and a key management server. The storage area network includes data storage devices, an encryption engine separate from the data storage devices, and a replication facility. The key management server is coupled to the storage area network for providing data encryption keys to the encryption engine. The storage area network is programmed for creating an encrypted storage object in the storage area network, and the key management server is programmed for assigning a data encryption key to the storage object and keeping a record of the data encryption key assigned to the storage object. The storage area network is further programmed for creating a replica of the storage object in the storage area network in coordination with the replication facility independent of the encryption engine, and the key management server is further programmed for assigning a data encryption key to the replica and keeping a record of the data encryption key assigned to the replica and an association of the replica with the storage object. The storage area network is further programmed for responding to a failure of the storage object in the storage area network by obtaining from the key management server an identification of the replica of the storage object that is associated with the storage object, and using the identification of the replica from the key management server to find the replica in the storage area network and use the replica to recover from the failure of the storage object.

BRIEF DESCRIPTION OF THE DRAWINGS

Additional features and advantages of the invention will be described below with reference to the drawings, in which:

FIG. 13 is a block diagram of a specific implementation of a data structure for the key set hierarchy of FIG. 12;

Figure 1:
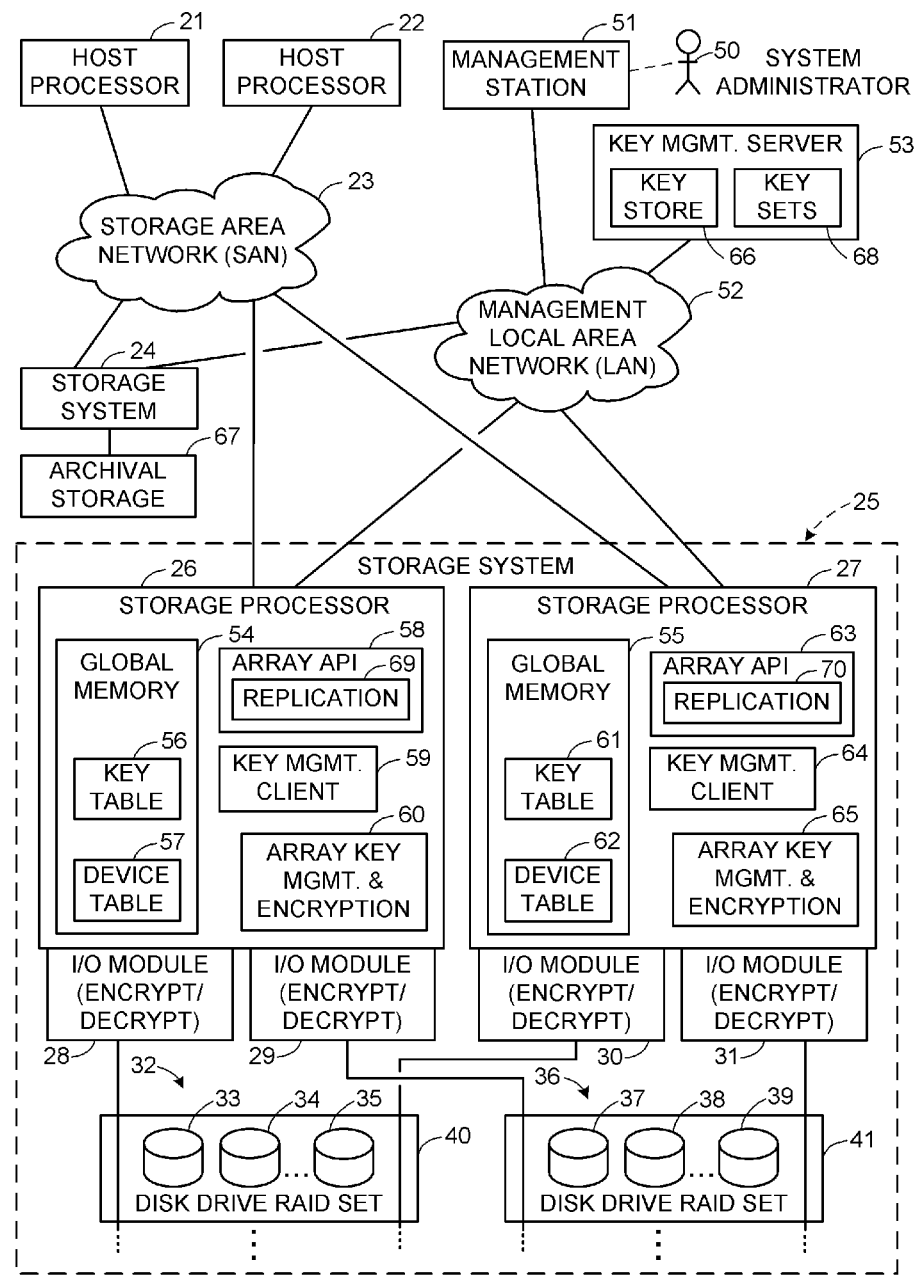
FIG. 1 is block diagram of a data processing system incorporating the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system incorporating the present invention for storage of encrypted data. The data processing system includes a number of host processors 21, 22, linked by a storage area network (SAN) 23 to a number of storage systems 24, 25.

The host processors 21, 22 can be general purpose digital computers, or the host processors can be processors programmed for performing dedicated functions such as database management or file system management. For example, the host processors could be general purpose digital computers programmed for scientific or engineering applications. Or the host processors could be file system managers providing network attached storage for a multiplicity of workstations in a business enterprise.

The SAN 23 communicates requests from the host processors 21, 22 to the storage systems for read or write access to specified logical blocks of storage in the storage systems. For example, the storage in each storage system is configured into storage objects such as logical volumes or logical unit numbers (LUNs) of the logical blocks, and each host is given access rights to one or more of the storage objects. The SAN 23, for example, is a Fibre Channel or Internet Protocol (IP) network, and the hosts communicate with the storage systems using the Fibre Chanel (FC) protocol or the Small Computer Systems Interface (SCSI) over IP (iSCSI) protocol.

Prior to granting storage access to a host processor, a storage system may require host authentication via a secure mechanism, such as the Kerberos protocol. A storage system may require authentication of each storage access request, for example, using a secure mechanism, such as the protocol described in Blumenau et al. U.S. Pat. No. 7,093,021 issued Aug. 15, 2006.

For enhanced data availability, each storage system 24, 25 includes an array of dual-port disk drives, and a dual-redundant data path and processor architecture. For example, the storage system 25 includes a first storage processor 26 and a second storage processor 27. The first storage processor 26 includes a first input-output (ILO) module 28 and a second I/O module 29. The second storage processor 27 includes a third I/O module 30 and a fourth I/O module 31.

The storage system 25 includes a first array 32 of disk drives 33, 34, . . . , 35 and a second array 36 of disk drives 37, 38, . . . , 39. Each disk drive in the first array of disk drives 32 is accessible through the first I/O module 28 or through the third I/O module 30. In a similar fashion, each disk drive in the second array of disk drives 36 is accessible through the second I/O module 29 or through the fourth I/O module 31. Therefore each disk drive is accessible regardless of failure of a single one of the processors 26, 27 or a single one of the I/O modules 28, 29, 30, 31.

In each array 32, 36, the disk drives are organized as redundant arrays of inexpensive disks (RAID), such as the RAID set 40 in the first array 32 and the RAID set 41 in the second array 36. For example, when the storage system 25 writes a block of data from a host processor to storage of one of the RAID sets 40, the block of data is written to one of the disk drives 33, 34, 35 in the RAID set, and a corresponding parity block in another one of the disk drives 33, 34, 35 in the RAID set is updated by a read-modify-write process. Later, if an attempt to read the data block from the disk drive fails, then the data block can be recovered (for the case of a single disk drive failure in the RAID set 40) by a parity computation upon the corresponding parity block and corresponding data blocks in the other disk drives of the RAID set. Further details regarding the storage and retrieval of data from a RAID set are found in Patterson, et al., Introduction to Redundant Arrays of Inexpensive Disks (RAID), Spring CompCon 89, February 27-Mar. 3, 1989, pp. 112-117, IEEE Computer Society, IEEE, New York, N.Y.

Prior to host access, a system administrator 50 configures each storage system 24, 25 so that the disk drives of each storage system are grouped into RAID sets, data blocks of the RAID sets are grouped into logical storage objects such as logical volumes or LUNs, and hosts are assigned access rights to one or more of the storage objects. For example, the mapping of logical data blocks to physical disk blocks can be performed by a table lookup, as described in Yanai et al., U.S. Pat. No. 5,206,939 issued Apr. 27, 1993. Hosts can be assigned access rights to one or more of the storage objects by programming an access control list (ACL) for each of the logical storage objects.

In the data processing system of FIG. 1, the system administrator 50 has a management station 51 from which the system administrator may remotely configure each of the storage systems 24, 25. For enhanced reliability and security, the management station 51 is interconnected to the storage systems 24, 25 via a dedicated management local area network (LAN) separate from the storage area network 23. The management LAN 52 may use a secure network communication protocol, or security features may be added to an ordinarily insecure network management protocol, for example, as described in Osmond U.S. Pat. No. 6,044,468 issued Mar. 28, 2000.

The present invention more particularly concerns storage and retrieval of encrypted data using encryption keys. For example, in the data processing system of FIG. 1, the storage system 25 receives plaintext from each host processor 21, 22, and encrypts the plaintext using a data encryption key to produce ciphertext. The ciphertext and not the plaintext is stored on the disk drives in the disk arrays 32, 36. Therefore, the plaintext is not exposed if a disk drive is stolen or if the disk drive is not erased before the disk drive is retired from service or re-assigned to another host.

In a preferred implementation, encryption and decryption is performed in each I/O module 28, 29, 30, and 31. Alternatively, the encryption and decryption could be performed by each storage processor or by an encryption and decryption offload device controlled by the storage processor, so that ciphertext and not plaintext is streamed to an I/O module during a write to storage.

In another alternative arrangement, plaintext is streamed to a disk drive, and a processor in the disk drive is programmed to encrypt the plaintext and store the ciphertext on the disk drive, and to decrypt the ciphertext when the ciphertext is read from the disk drive. For enhanced security, if the encryption or decryption is performed by a processor in the disk drive, then the key for the encryption or decryption is provided to the disk drive only when needed, and it is kept in volatile memory of the disk drive while being used, and erased from the volatile memory as soon as it has been used.

By performing encryption and decryption in each I/O module, it is easy to provide the additional processing resources required for encryption and decryption because the encryption and decryption is pipelined with the other functions of the storage processor. The I/O module can be constructed so that it is compliant with the government standard of FIPS publication 140-2 Security Requirements for Cryptographic Modules, May 25, 2001, National Institute of Standards and Technology, Gaithersburg, Md.

For example, the data processing system has a key management server 53 separate from the storage systems 24, 25. The key management server 53 provides a secure backup for the data encryption keys and key encryption keys used by the storage systems 24, 25. The key management server securely logs key creation and deletion operations. The key management server is maintained with an availability of at least as great as the availability of the storage in the storage systems 24, 25. The key management server 53, for example, is located in a physically secure area including the management station 51. The key management server 53, for example, responds to a "get key" request for a data encryption key from a storage server by returning the data encryption key encrypted with a key encryption key, and sending this "wrapped key" to a storage processor 26, 27 of the storage system 25. For example, the key management server 53 is constructed so that it is compliant with the IEEE P1619.3/D1, Draft Standard for Key Management Infrastructure for Cryptographic Protection of Stored Data (May 2007), IEEE, Piscataway, N.J.

When an I/O module needs a data encryption key, it unwraps the wrapped key by decrypting the wrapped key with the key encryption key. In this fashion, unencrypted data encryption keys may exist only where they can be protected by physical means from unauthorized access. For example, the unencrypted data encryption keys are kept in volatile memory of an application specific integrated circuit (ASIC) in the I/O module, and the ASIC is encased in a fiberglass-epoxy material on the I/O module or encased in another form of a tamper proof or resistant shell or material.

The wrapped data encryption key also includes a redundancy code such as a Message Authentication Code (MAC) so that the I/O module can verify the integrity of the data encryption key before the I/O module uses the data encryption key for encrypting plaintext from a host. If the MAC indicates corruption of the data encryption key, then the I/O module discards the data encryption key, the error is reported to the management station 51, and the storage system sends a "get key" request to the key management server 53 to obtain a new copy of the wrapped data encryption key.

In a similar fashion, the integrity of the stored ciphertext is verified by a redundancy code such as a MAC stored with the ciphertext. When the stored ciphertext is recalled and decrypted in response to a read request from a host processor, the redundancy code is verified. If the redundancy code indicates corruption, then the decrypted plaintext is discarded. An attempt is made to recover from this error by accessing each corresponding parity block and its related data blocks on the RAID set, re-computing the ciphertext using a parity calculation upon the corresponding parity blocks and their related data blocks on the RAID set, and again decrypting this recomputed ciphertext.

The detection of key or data corruption, and recovery from a single-disk error in a RAID set, however, might not be sufficient to recover data that has become unavailable due to use of an improper key during encryption or loss of the proper key for decryption. To ensure availability of a proper key for encryption and decryption of each storage object to be encrypted or decrypted, the storage systems 24, 25 and the key management server 53 maintain an association of object identifiers and respective data encryption keys for the storage objects to be encrypted or decrypted. In particular, when a data encryption key is assigned to a storage object, the data encryption key is associated with an object identifier identifying the storage object. The object identifier is linked to both the data encryption key and the storage object throughout the life of the data encryption key.

To ensure that a wrong key is not used during encryption or decryption of a storage object, the object identifier is verified prior to any use of the data encryption key for the storage object and performance of any I/O operation upon the storage object.

For example, the data encryption key for the storage object is cryptographically bound to the object identifier of the storage object to provide an end-to-end key correctness check. Before the data encryption key is used for encrypting or decrypting a storage object, the object identifier bound to the data encryption key is tested to determine whether or not it identifies the storage object to be encrypted or decrypted. If the object identifier bound to the data encryption key does not identify the storage object to be encrypted or decrypted, then the data encryption key is a wrong key for encrypting or decrypting the storage object.

For example, wrapped key information for a storage object is produced by encrypting a combination of the data encryption key for the storage object and the object identifier for the storage object. When the I/O module is requested to encrypt or decrypt the storage object, the I/O module is given an object ID identifying the storage object, and the I/O module is also given wrapped key information. The I/O module "unwraps" the wrapped key information by decrypting the wrapped key information with a key encryption key to produce an unwrapped data encryption key and an unwrapped object identifier. The I/O module compares the unwrapped object identifier to the object identifier of the storage object to be encrypted or decrypted, and if the unwrapped object identifier is different from the object identifier of the storage object to be encrypted or decrypted, then the I/O module returns an error instead of encrypting or decrypting the storage object with the unwrapped data encryption key.

A catastrophic failure could cause confusion of the object identifiers and their associated data encryption keys so that the cryptographic binding of the object identifiers to the keys would not necessarily detect use of the wrong key for encryption or decryption. A catastrophic failure also could cause a loss of the association of an object identifier with its associated data encryption key. For example, in a data processing system having multiple storage systems sharing a key management server but having separate namespaces for storage objects, recovery from a catastrophic failure could cause a data encryption key for a storage object encrypted on one of the storage systems to become confused the data encryption key for a storage object encrypted on another one of the storage systems. A similar problem could arise when a storage system attempts to decrypt a backup or archive copy that was encrypted on another storage system having a different namespace, and the storage system cannot find the object ID of the backup or archive copy in its own namespace.

To provide a failsafe key recovery mechanism in the event of confusion or loss of the association of an object identifier with its respective data encryption key, the storage systems 24, 25 and the key management server 53 also maintain a backup index to the data encryption keys in the key server context. The backup index associates the object identifiers and their data encryption keys with an absolute key reference. If a storage system has a data encryption failure when using a data encryption key that passes the key correctness check, then the storage system can use the absolute key reference to request a new copy of the data encryption key from the key management server 53.

A storage system can also use the absolute key reference to request the correct encryption key from the key management server 53 when the storage system cannot find, in its own namespace, the object ID of a backup or archive copy of a storage object. In the storage system of FIG. 1, for example, the storage system 24 may access archival storage 67 containing backup copies of objects in its own storage as well as backup copies of objects from the storage system 25. In this case, the storage system 24 may obtain the absolute key reference for a backup copy of an object from an index of the backup or archive copies, or from unencrypted metadata stored with the backup or archive copy. Thus, the absolute key reference can be used as a failsafe, key of last resort, to recover customer data in enterprise applications.

For example, in global memory 54, 55 of the storage processors 26, 27 of the storage system 25 of FIG. 1, there is kept a dual mapping of the relationship of storage objects to their data encryption keys. The global memory 54 of the first storage processor 26 includes a key table 56 providing a mapping of storage objects in the disk storage arrays 32, 36 to their respective wrapped data encryption keys, and a device table 57 providing a mapping of each storage object to one or more storage devices in the disk storage arrays. The device table 57 further provides a mapping of each storage object to the absolute key reference of the data encryption key for encrypting or decrypting the storage object.

For example, the first storage processor 26 is programmed with an array application program interface (API) 58 for receiving configuration and control commands from the management station 51. The first storage processor 26 is also programmed with a key management client 59 for sending "get key" requests to the key management server 53 and receiving replies from the key management server. The first storage processor 26 is further programmed with an array key management and encryption program module 60.

In a similar fashion, the global memory 55 of the second storage processor 27 also includes a key table 61, a device table 62, a key management client 64, and an array key management and encryption module 65. For redundancy, the key table 61 is maintained as a copy of the key table 56, and the device table 62 is maintained as a copy of the device table 57. Any updates to the key table 56 or the device table 57 are mirrored to the key table 61 or the device table 62, and any updates to the key table 61 or the device table 62 are mirrored to the key table 56 or the device table 57.

Figure 2:
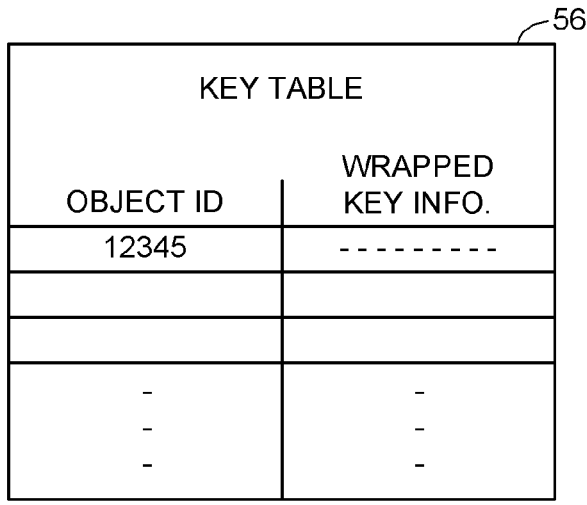
FIG. 2 is a block diagram of a key table introduced in FIG. 1.

As shown in FIG. 2, the key table 56 stores object identifiers in association with their respective wrapped data encryption key information.

Figure 3:
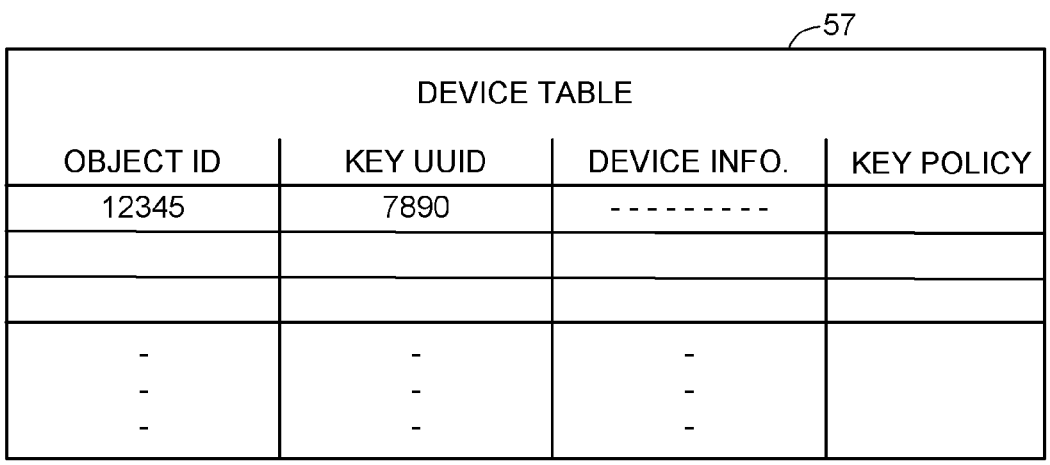
FIG. 3 is a block diagram of a device table introduced in FIG. 1.

As shown in FIG. 3, the device table 57 stores the object identifiers in association with respective globally unique key identifiers (KEY UUID), respective device information, and respective key policy information. Each globally unique key identifier is unique with respect to the set of all data encryption keys used by the storage systems serviced by the key management server (53 in FIG. 1).

The device information in the third column of the device table 57 specifies a mapping of the logical extent of each storage object to storage of one or more of the disk drives in the disk arrays 32 and 36. In general, the mapping of the logical extent of a storage object could be specified by a list of disk drive identifiers and an offset and extent for each of the disk drives. In practice, it is more convenient for the system administrator to configure the storage of the disk array into more regular sized storage objects, such as partitions of the disk drives, entire disk drive, stripes of data across the disk drives in the RAID sets, or the data storage of entire RAID sets. For example, the device information includes a RAID set identifier and an identifier of a particular disk drive partition within the RAID set or a particular data stripe across the disk drives in the RAID set. The device information for the storage object may also include a pointer to an access control list (ACL) specifying particular host processors having rights to access the storage object.

The key policy information specifies a block encryption algorithm in which the data encryption is used, a mode for encrypting a string of plaintext blocks using the block encryption algorithm, the key length, a key format, and a key lifetime. For example, the block encryption algorithm is AES, the mode is CBC or XTS, the key length is either 128 bits or 256 bits. The key format is either an unwrapped data encryption key, a data encryption key wrapped with a key encryption key, or a data encryption key and object data wrapped via a key encryption key. The default for the key lifetime is no expiration.

Figures 4, 5:
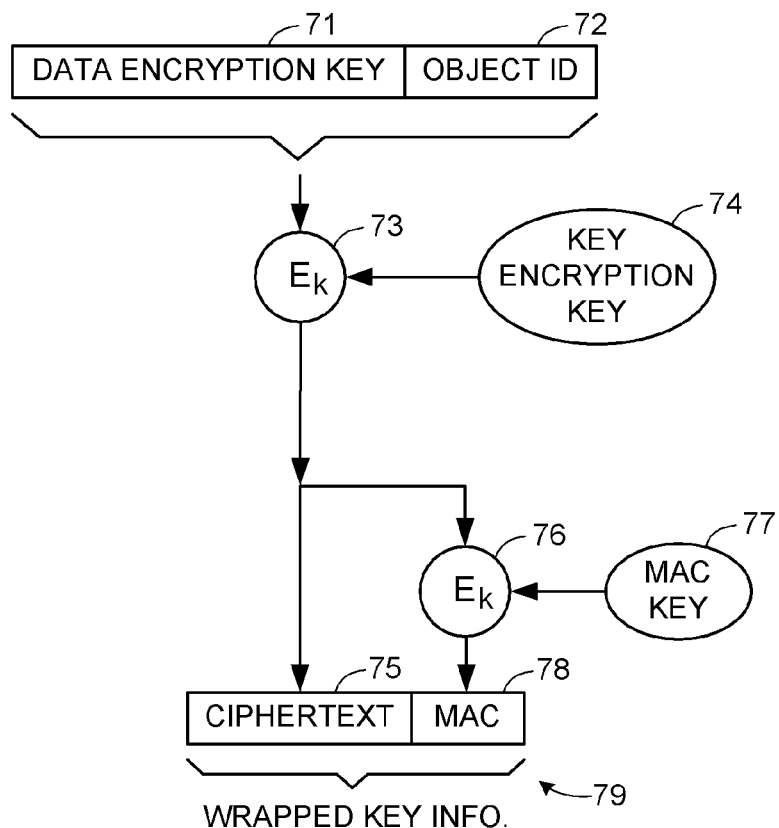
FIG. 4 is a block diagram of a key store introduced in FIG. 1.
FIG. 5 is a flow diagram of a process of encrypting a data encryption key together with information to be associated with the data encryption key to produce wrapped key information.

FIG. 4 shows the key store 66 containing the wrapped data encryption keys in the key management server (53 in FIG. 1). The key store 66 is organized as a table associating the wrapped key information for each data encryption key with a domain name, an object ID, a key UUID. The domain name identifies a domain within which each object ID is unique. For example, each storage system is a separate domain, and the domain name is a unique name for the storage system, such as a Universal Resource Identifier (URI) for the storage system. The key UUID is unique across all of the domains. For example, each time that the key management server puts wrapped key information for a new data encryption key into the key store, the key management server puts a new unique key UUID in the key store 66 in association with the wrapped key information.

When presented with a "get key" request including either a globally unique key identifier or an object ID from a key management client (59, 64 in FIG. 1), the key management server (53 in FIG. 1), for example, looks up the wrapped key information associated with this globally unique key identifier or object ID in the key store 66 and returns this wrapped key information to the key management client.

In an alternative construction for the key store 66, the key store 66 contains unwrapped data encryption keys instead of wrapped key information of the data encryption keys. In this case, when presented with a "get key" request, and based on the "get key" request and the key management client that originated the request, the key management server (53 in FIG. 1) looks up the unwrapped data encryption key associated with the globally unique key identifier or object ID in the key store 66, and then "wraps up" this data encryption key with its associated object ID, and returns this wrapped key information to the key management client.

FIG. 5 shows a process of creating the wrapped key information. For example, this process is performed by the key management server (53 in FIG. 1) when a key management client first requests a data encryption key for an object, or on all requests. In an alternative construction for the key management server, when the key management server receives the first request for a data encryption key for an object from a key management client, the key management server requests an I/O module of the storage processor of the key management client to create the wrapped key information and return the wrapped key information to the key management server.

To perform the process of FIG. 5, a new data encryption key 71 is produced by a secure pseudo-random number generator. This data encryption key 71 is concatenated with the object ID 72 of the object to be encrypted with the data encryption key. The combination of the data encryption key 71 and the object ID 72 is encrypted (step 73) with a key encryption key 74 to produce ciphertext 75. The key encryption key 74, for example, is unique to one or more of the I/O modules of the storage system of the key management client that is requesting the wrapped key information. At this time, the I/O modules of the storage processor have already been securely programmed with the key encryption key 74.

For example, in the storage system 25 of FIG. 1, the I/O modules 28 and 30 are programmed with one key encryption key, and the I/O modules 29 and 31 are programmed with another key encryption key. Each storage object in the storage system 25 is stored in either the first disk drive array 32 or in the second disk drive array 36. In this example, the particular storage array and I/O modules associated with the object are found by decoding the object ID. An object having an even object ID is stored in the first storage array 32 and accessed via the I/O module 28 or the I/O module 30, and an object having an odd object ID is stored in the second storage array 36 and accessed via the I/O module 29 or the I/O module 31.

In FIG. 5, for detection of key corruption, the ciphertext 75 is encrypted (step 76) by a MAC key 77 to produce a MAC 78. The MAC 78 is concatenated with the ciphertext 75 to produce the wrapped key information 79.

Figure 6:
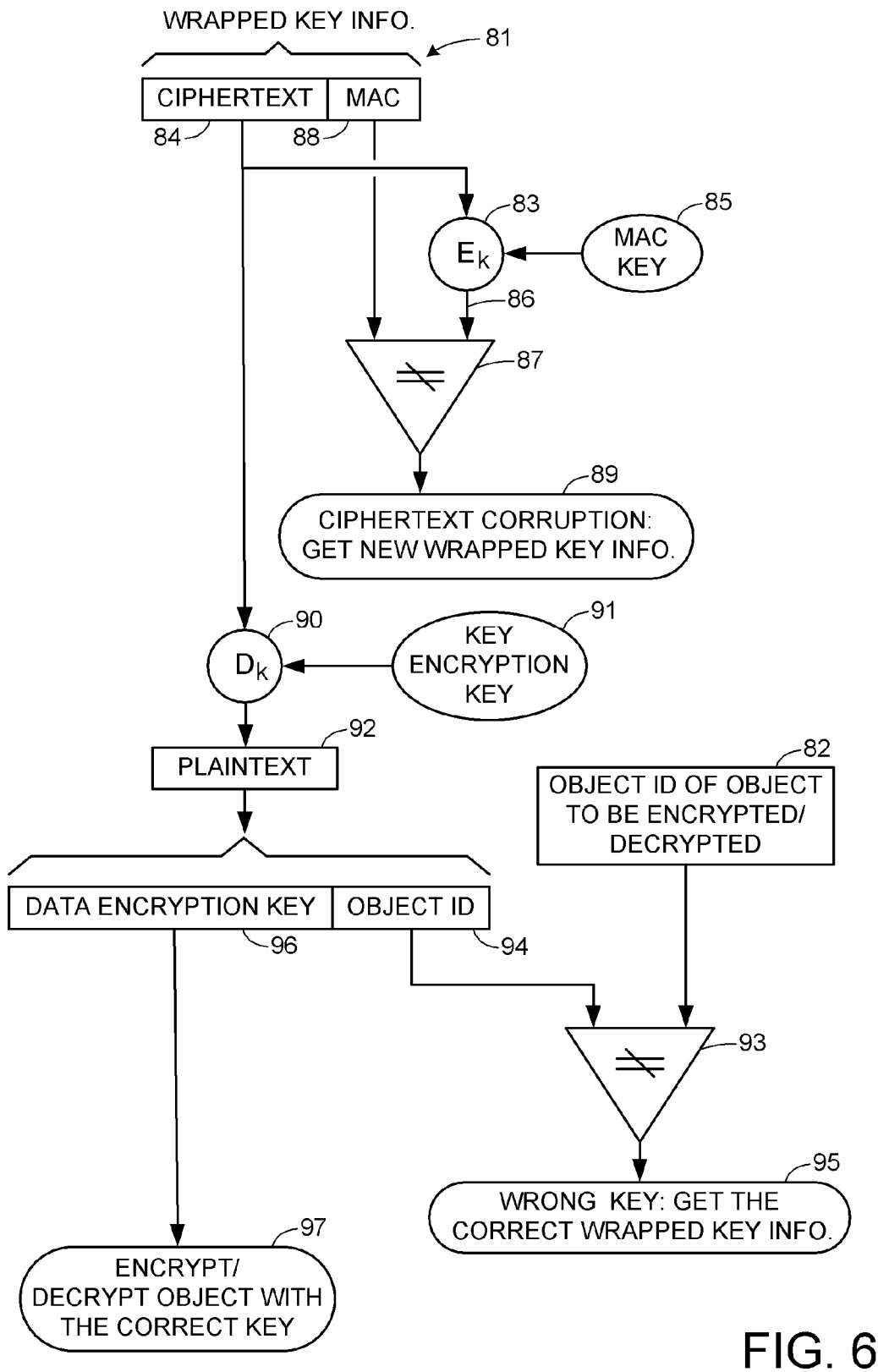
FIG. 6 is a flow diagram of a process of decoding, checking, and decrypting wrapped key information to produce a data encryption key for a specified data storage object.

FIG. 6 shows how an I/O module checks and decrypts the wrapped key information whenever an array key management and encryption module requests the I/O module to write encrypted data of an object to disk or read encrypted data of a storage object from disk. The array key management and encryption module provides, to the I/O module, wrapped key information 81 and an object ID 82 of the object to be encrypted or decrypted. The I/O module encrypts (step 83) the ciphertext 84 in the wrapped key information 81 with the MAC key 85 to produce an encryption result 86 that is compared (step 87) to the MAC 88 in the wrapped key information. If the comparison 87 indicates that the encryption result 86 is different from the MAC 88, then the ciphertext 84 is most likely corrupted, and the I/O module returns an error to the array key management and encryption module. In this case, the array key management and encryption module invokes its key management client to request a new copy of the wrapped key information from the key management server (step 89) in an attempt to recover from the error by re-initiating the process of FIG. 6 upon the new copy of the wrapped key information.

If the comparison 87 indicates that the encryption result 86 is the same as the MAC 88, then the I/O module decrypts (step 90) the ciphertext 84 of the wrapped key information 81 with the I/O module's key encryption key 91 to produce plaintext 92. The object ID 82 of the storage object to the encrypted or decrypted is compared (step 93) to the object ID 94 that was unwrapped from the wrapped key information 81 and appears in the plaintext 92. If the comparison 93 indicates that the object ID 82 of the storage object to the encrypted or decrypted is different from the object ID 94 unwrapped from the wrapped key information 81, then the data encryption key 96 unwrapped from the wrapped key information 81 is most likely a wrong data encryption key for encrypting or decrypting the storage object identified by the object ID 82. Therefore, in this case, the I/O module returns an error to the array key management and encryption module, and in response, the array key management and encryption module invokes its key management client to request a new copy of the wrapped data encryption key from the key management server (step 95) in an attempt to recover from the error by re-initiating the process of FIG. 6 upon the new copy of the wrapped key information.

If the comparison in step 93 indicates that the object ID 82 of the storage object to the encrypted or decrypted is the same as the object ID 94 unwrapped from the wrapped key information 81, then the data encryption key 96 unwrapped from the wrapped key information 81 and appearing in the plaintext 92 is most likely the correct key for decrypting the storage object. The I/O module encrypts or decrypts (step 97) the storage object with this data encryption key 96.

Figure 7:
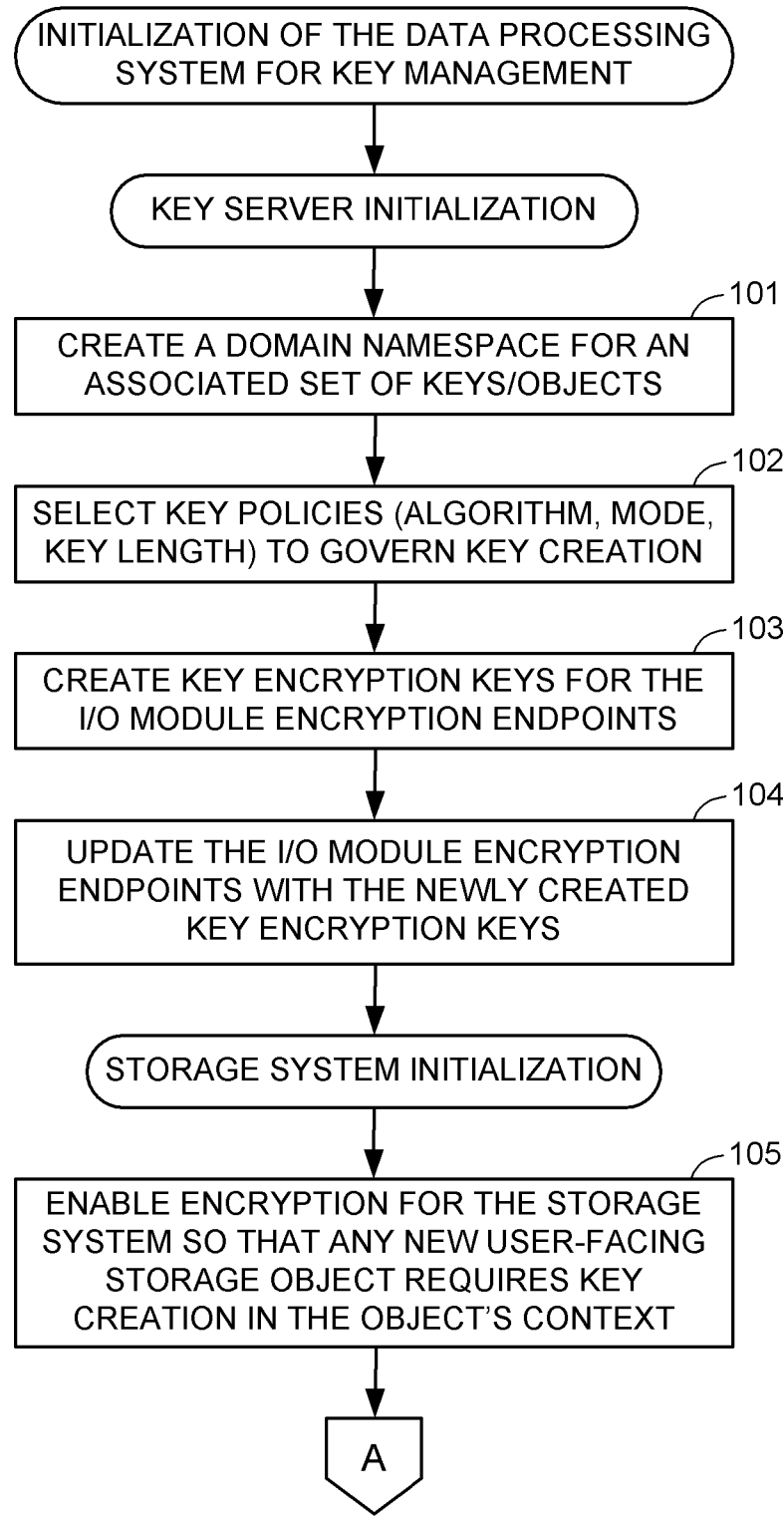
FIGS. 7 and 8 together comprise a flowchart of a procedure for initialization of the data processing system of FIG. 1 for key management.
Figure 8:
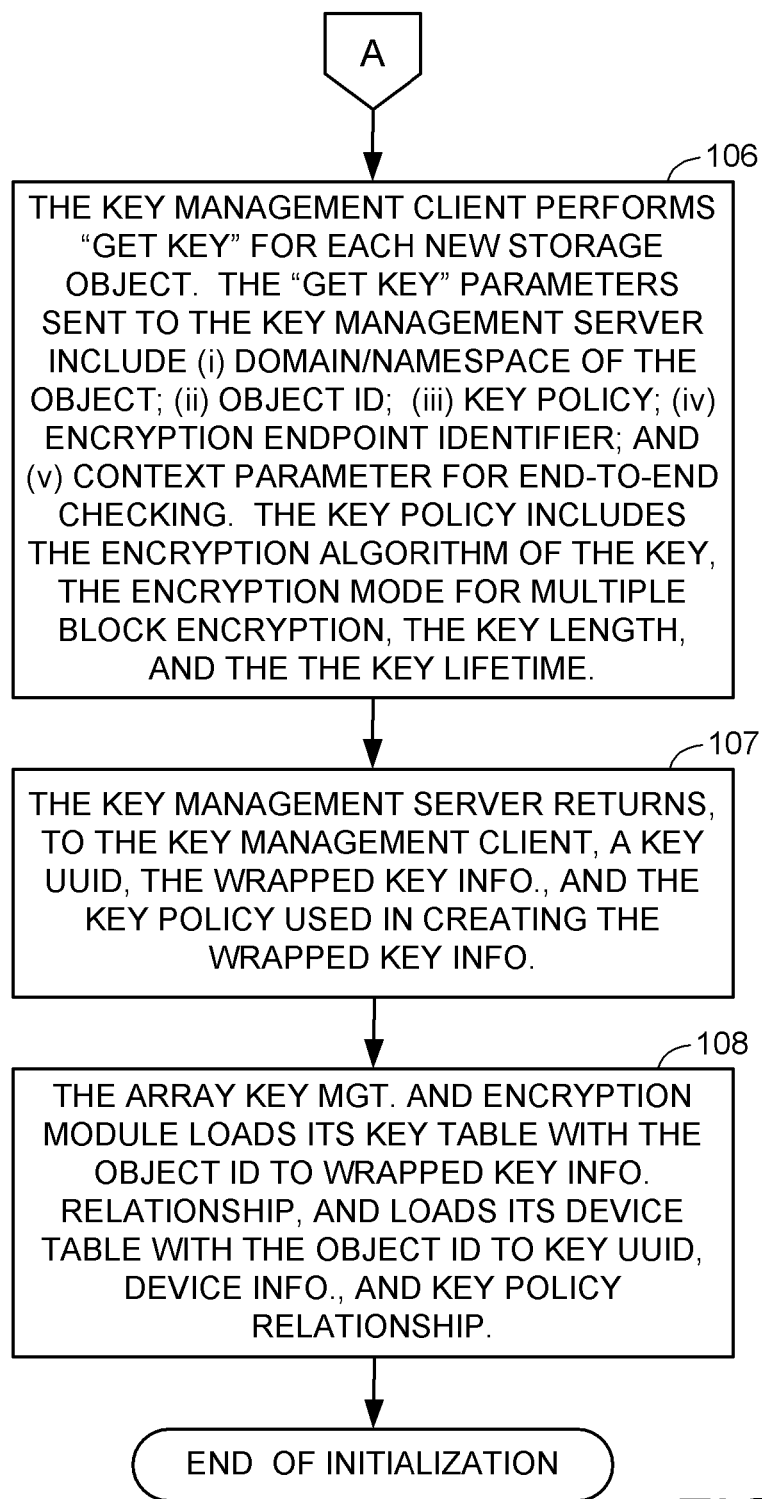

FIGS. 7 and 8 show a procedure for initialization of the data processing system of FIG. 1 for key management. This procedure includes key management server initialization (steps 101 to 104) followed by storage system initialization (steps 105 to 108).

In a first step of 101 of FIG. 7, the system administrator creates a domain namespace in the key management server for an associated set of keys and objects of a storage system. For example, the system administrator loads the key management server with the URI name of the storage system, and the key management server checks whether or not it already has been loaded with this URI name, and replies with an indication of success that the name has been accepted as a new name or an error message that the name has already been registered.

In step 102, the system administrator selects key policies in the key management server to govern key creation for the domain namespace. For example, the system administrator may specify that all data encryption keys for the domain namespace are to be wrapped with an associated object ID and encrypted with a key encryption key using a specified block encryption algorithm, mode, key length, and key lifetime.

In step 103, the system administrator requests the key management server to create key encryption keys for I/O module encryption endpoints in the domain namespace. The key management server creates the key encryption keys, and transmits them to the I/O module encryption endpoints in the domain namespace. In step 104, the I/O modules are updated with the newly created key encryption keys. For example, when the I/O modules are manufactured, they are initially programmed with well known key encryption keys, which must be updated before the I/O modules will perform encryption or decryption.

In step 105, the system administrator enables encryption for the storage system so that any new user-facing storage object requires key creation in the object's context. Therefore, in step 106, when a storage processor services a host processor request for creation of a new storage object, the key management client of the storage processor issues a "get key" request to the key management server for the new storage object. The "get key" parameters sent to the key management server include: (i) the domain name of the namespace of the storage object; (ii) the object ID; (iii) the key policy; (iv) an encryption endpoint identifier; and (v) a context parameter for end-to-end checking. The key policy includes the block encryption algorithm for the key, the encryption mode for multiple block encryption, the key length, and the key lifetime.

The key management server checks the "get key" parameters against the context parameter to detect any corruption of the "get key" parameters, looks up the specified domain name to verify that the domain name has been registered, and compares the requested key policy with any key policy requirements that have been registered with the domain name, in order to select a key policy for creating the requested key. The key management server does a lookup of the object ID in existing entries in the key store for the domain name in order to determine whether a key has already been assigned to the specified object ID in the namespace of the specified domain name. The key management server returns an error message if the key management server requests a key for a new object and the server already finds that a data encryption key has already been created for the object. Otherwise, in accordance with the selected key policy, the key management server creates a new key UUID and a new data encryption key and encodes the new data encryption key together with the specified object ID with the key encryption key for the specified encryption endpoint in the namespace of the specified domain.

In step 107, the key management server returns, to the key management client, the key UUID, the wrapped key information, and the selected key policy that was actually used in creating the wrapped key. In step 108, the array key management and encryption module loads its key table with the object ID to wrapped key info. relationship, and loads its device table with the object ID to key UUID, device info., and key policy relationship. At this point, the key management server and the storage system have been initialized for encryption or decryption of the object and for recovery from corruption of the key information for the object.

Figure 9:
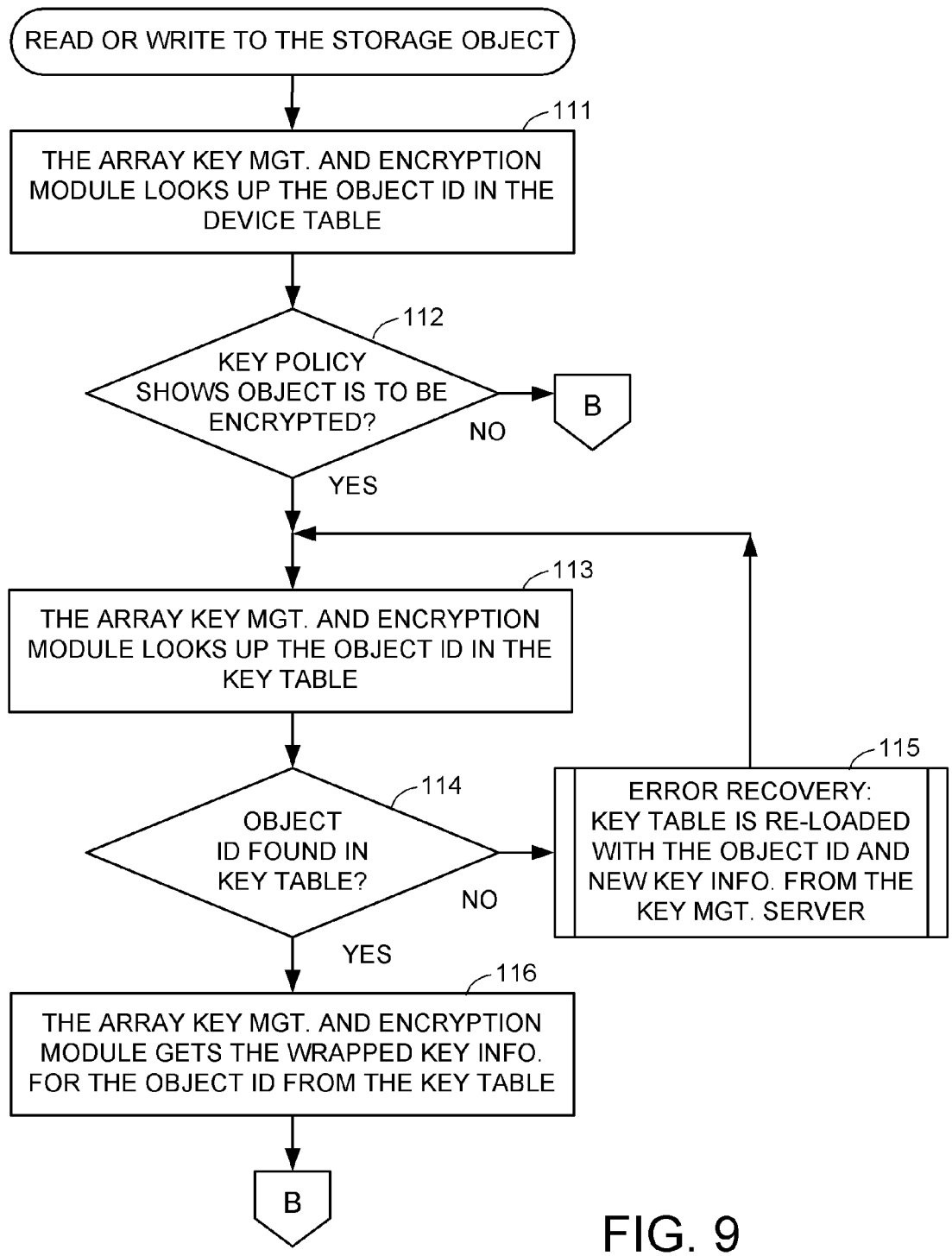
FIGS. 9 and 10 together comprise a flowchart of a procedure for reading or writing to a storage object in the data processing system of FIG. 1.
Figure 10:
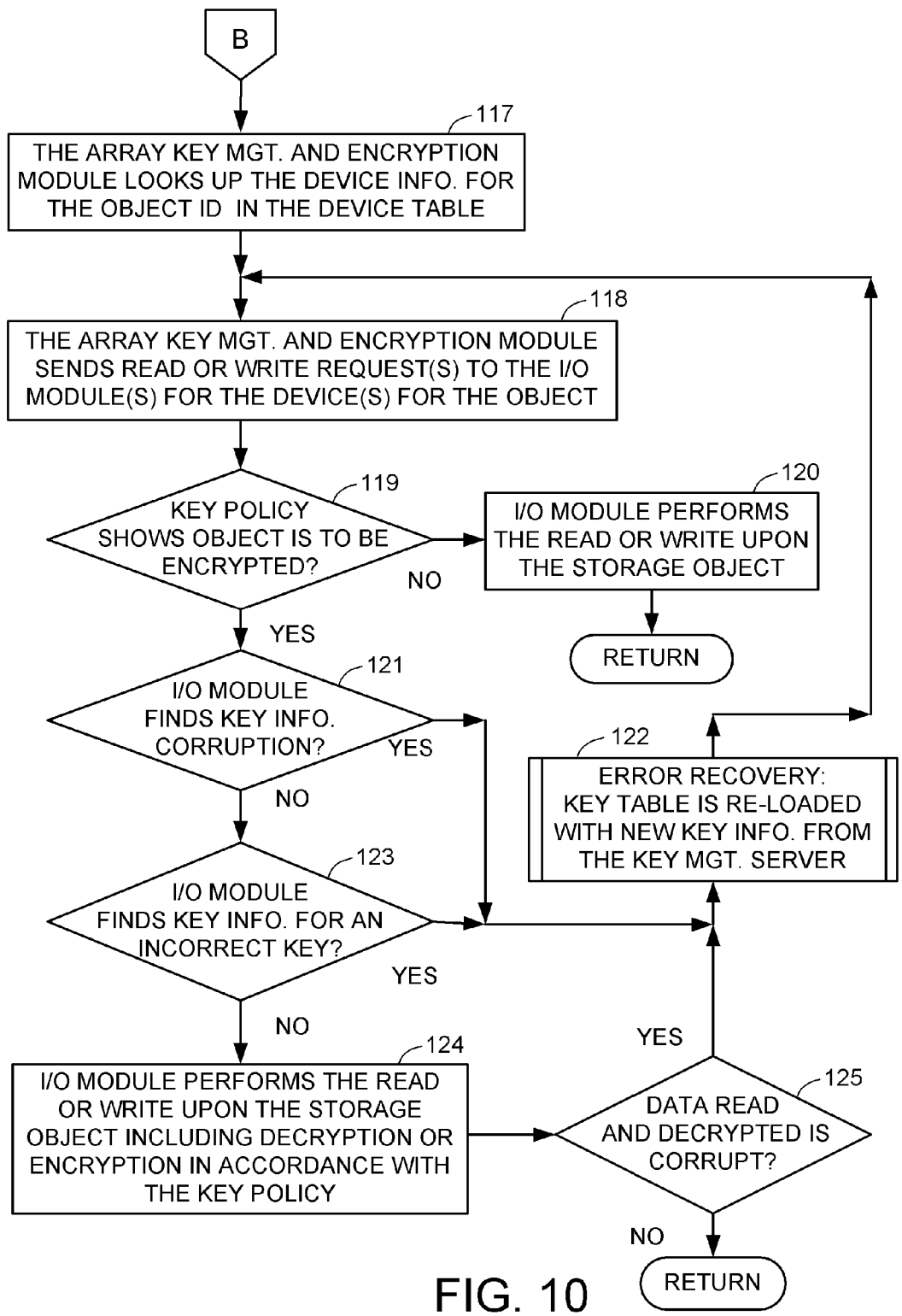

FIGS. 9 and 10 together comprise a flowchart of a procedure for reading or writing to a specified storage object in the data processing system of FIG. 1. In a first step 111, the array key management and encryption module looks up the object ID in its device table. In step 112, if the key policy in the device table shows that the object is to be encrypted, then execution continues to step 113. In step 113, the array key management and encryption module looks up the object ID in the key table. In step 114, if the object ID is not found in the key table, then execution branches to step 115 to perform error recovery. If the error recovery is successful, then the key table is re-loaded with the object ID and new key info. from the key management server, and execution loops back to step 113.

For example, in step 115, the storage processor invokes its key management client to fetch a new copy of the key information for the object ID from key management server and re-load it into the key table. If this new copy of the key information is corrupt or incorrect, then the device table of the storage processor is accessed to find the key UUID associated with the object in the device table of the storage processor, and a new copy of the key information for the key UUID is obtained from the key management server and re-loaded into the key table. If this new copy of the key information is corrupt or incorrect, then an attempt is made to get correct key information from the device table of the other storage processor in the storage system. If this new copy of the key information is corrupt or incorrect, then the device table of this other storage processor is accessed to find the key UUID associated therewith the object ID. If this key UUID is not the same as a key UUID previously found for the object ID, then it is used to fetch a new copy of the key information from the key management server. If this new copy of the key information is corrupt or incorrect, then an attempt is made to a key UUID associated with the object ID in storage of the data processing system or in an archive index or in archive storage, and if this key UUID is not the same as a key UUID previously found for the object ID, then it is used to fetch a new copy of the key information from the key management server.

In step 114, if the object ID is found in the key table, then execution continues to step 116. In step 116, the array key management and encryption module gets the wrapped key info. for the object ID from the key table, and execution continues to step 117 in FIG. 10. Execution also continues to step 117 in FIG. 10 from step 112 if the key policy for the object specifies that the object is not to be encrypted.

In step 117 of FIG. 10, the array key management and encryption module looks up the device info. for the object ID in the device table. In step 118 the array key management and encryption module sends one or more read or write requests to one or more I/O modules for accessing the disk drives storing one or more logical extents of the object. In step 119, if the key policy does not show that the object is to be encrypted, then execution branches to step 120. In step 120, the I/O module performs the read or write upon the storage object, and execution returns.

In step 119, if the key policy shows that the object is to be encrypted, then execution continues to step 121. In step 121, if any of the I/O modules finds corruption of the key information for the object, as described above with reference to FIG. 6, then execution branches from step 121 to step 122 to perform error recovery by attempting to fetch a new copy of the key information from the key management server, as described above with reference to step 115. If this error recovery is successful, then the key table is re-loaded with new key information from the key management server, and execution loops back to step 118 to re-start the I/O operation with the new key information.

In step 121, if the I/O module does not find corruption of key information, then execution continues to step 123. In step 123, if the I/O module finds that the key information is not the correct key information for the specified object ID, as described above with reference to FIG. 6, then execution branches to step 122 to perform error recovery. Otherwise, execution continues from step 123 to step 124. In step 124, the I/O module performs the read or write operation upon the storage object including decryption for a read or encryption for a write in accordance with the key policy. In step 125, for a read operation, if data read and decrypted is found to be corrupt, for example as indicted by a redundancy code or a MAC in the data, this is likely due to the wrong data encryption key being used, for example, because the data encryption key is the key for a different object in the namespace of another data storage system. In this case, execution branches from step 125 to step 122 to perform error recovery. Otherwise, execution returns from step 125.

As described above, when a storage processor creates a new storage object in the data storage of its storage system, the key management client sends a "get key" request to the key management server (53 in FIG. 1) to get a data encryption key for the new storage object. In a typical case, the key management server will return wrapped key information containing a new data encryption key for the new storage object. For certain applications, however, there will be different storage objects sharing the same data encryption key. In particular, if the new storage object contains data that is an identical copy of the data stored in an existing storage object, replicated at a layer below the encryption function, then the new storage object will be encrypted with the same data encryption key as the existing storage object.

For example, in the data processing system of FIG. 1, the array application program interface (API) modules 58, 63 include respective replication facilities 69, 70. These replication facilities have the capability of replicating a specified existing source storage object in the data storage of the storage system 25 to create one or more new destination storage objects that are replicas of the source storage object. Such a replica can be a local copy if the destination storage object is in the storage of the storage system 25, or such a replica can be a remote copy if the destination storage object is in the storage of another storage system in the SAN 23, such as in data storage of the storage system 24.

The replication facility for each storage system may have various capabilities. For example, a basic capability is to create a local or remote copy of a "read-only" source storage object. A more sophisticated replication facility may create synchronous or asynchronous copies of a "read-write' source storage object, for example, as described in Yanai et al., U.S. Pat. No. 6,502,205 issued Dec. 31, 2002, incorporated herein by reference. A replication facility may also create a "snap-shot copy" of a "read-write" source storage object, for example, as described in Kedem U.S. Pat. No. 6,076,148 issued Jun. 13, 2000, incorporated herein by reference, and in Armangau et al., U.S. Pat. No. 6,792,518, issued Sep. 14, 2004, incorporated herein by reference, and Bixby et al., Patent Application Publication US 2005/0065986 A1 published Mar. 24, 2005, entitled "Maintenance of a File Version Set Including Read-Only and Read-Write Snapshot Copies of a Production File," incorporated herein by reference.

If the source storage object is a "read only" source object and the destination storage object is to be a complete copy of the source object, then the destination storage object is to contain data that is an identical copy of the data stored in the source storage object. Also, if the source storage object is a "read-write" storage object and the destination storage object is to be a synchronous copy of the source storage object, then the destination storage object should also contain data that is an identical copy of the data stored in the source storage object. In these cases, the new storage object will be encrypted with the same data encryption key as the existing storage object.

For replicas containing identical data, sharing of the data encryption key eliminates the need to decrypt data read from the source storage object and encrypt this data for storage in the destination storage object. Deletion of the shared data encryption key from the data processing system will cause all objects encrypted with this data encryption key to become unavailable, as if all of these objects were deleted simultaneously. By specifying an expiration lifetime in the key store 66 for a shared key, it is possible to manage the lifetime of the data in or from a source storage object without managing every replica of the storage object for the lifetime of the data.

For example, in FIG. 1, the storage system 25 may contain mirrored copies of one source object, and the source object and not its mirrored copies may be registered with the key management server 53. For example, the RAID set 41 can be maintained as a synchronous mirror of the RAID set 40. If all replicas of the source object in the storage system 25 share the same data encryption key as the source object, then all of these replicas would become unavailable if the key management server would delete its record of the source object and its data encryption key from its key store 66, and also delete any copy of this data encryption key from the key tables 56 and 61 of the storage processors 26, 27.

Recovery from a catastrophic storage system crash that may cause confusion of object identifiers is also facilitated if successful decryption of a storage object with a given data encryption key will result in the same data regardless of whether the storage object is an original source object or one of its replicas. In this case, the data of the storage object will be successfully recovered regardless of any confusion of the object identifier. It will not matter if the data of the storage object is recovered from a replica instead of the source storage object.

It is also desirable for the key management server 53 to associate and track for management purposes the encrypted source objects and their replica destination objects in the storage area network 23, performed in conjunction with the replica management functionality. For example, when a key management client requests a data encryption key for a new storage object to be a replica of a specified source storage object, the key management client specifies whether or not the data encryption key for the replica should be either the same as the data encryption key of the specified source storage object or an entirely new data encryption key for the replica. In either case, the key management server associates a new record of the replica storage object and its assigned data encryption key in the key store 66 with an existing record of the source storage object. The key management server 53 performs the association by linking the new record of the new replica storage object in the key store 66 to the existing record of the specified source storage object in the in the key store 66.

The association of the source storage object to its replicas allows all customer data in the storage area network 23 to be managed as a single entry for deletion or tracked for association by using the keys referenced upon creation. For example, the key management server creates a new record in a key sets data structure 68 and links this new record in the key sets data structure 68 to the new record of the new replica storage object in the key store 66 and to the existing record of the specified source storage object in the in the key store 66. The key sets data structure 68 provides a history or lineage of replicated encrypted objects and an index of these objects into their respective records in the key store 68.

Figure 11:
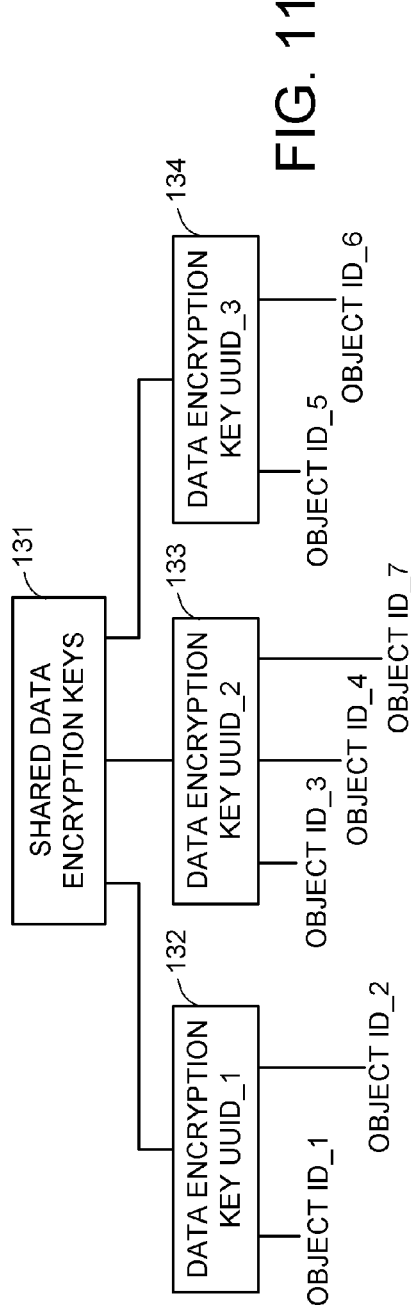
FIG. 11 is a block diagram of an index in the key management server of FIG. 1 for locating storage objects in the data processing system of FIG. 1 that share data encryption keys.

For example, as shown in FIG. 11, the key management server may maintain an index or directory 131 of data encryption keys shared among encrypted storage objects in the storage area network. The index or directory 131 includes a list of the shared data encryption keys, and for each such data encryption keys, a pointer to a respective index or directory 132, 133, 134 for each shared data encryption key. The respective index or directory 132, 133, 134 for each shared data encryption key includes a list of pointers to the records in the key store (66 in FIG. 1) for the storage objects that share the same data encryption key. For example, as shown in FIG. 11, object ID_1 and object ID_2 share the same data encryption key having UUID_1; object ID_3, object ID_4, and object ID_7 share the same data encryption key having UUID_2; and object ID_5 and object ID_6 share the same data encryption key having UUID_3.

Figure 12:
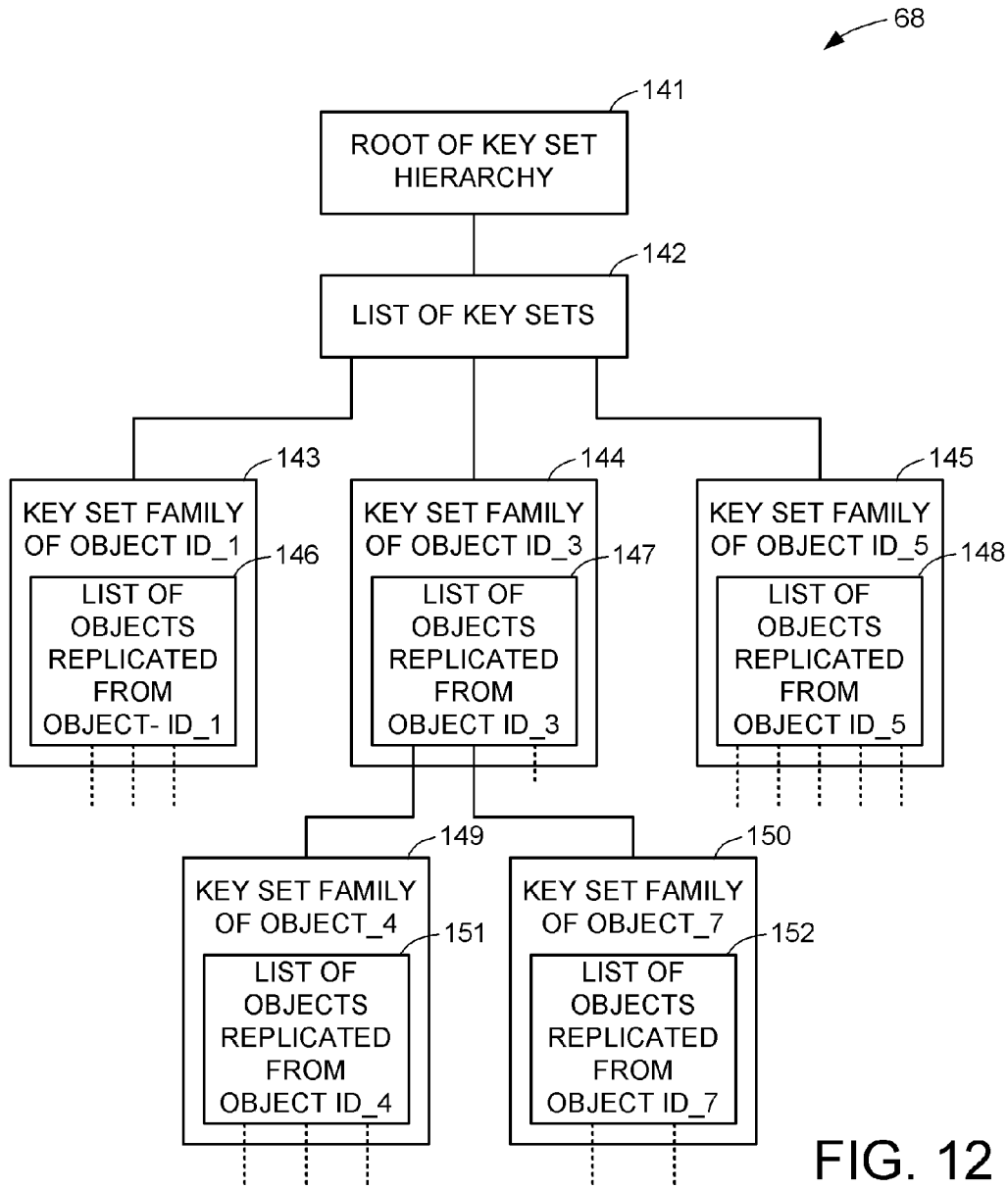
FIG. 12 is a block diagram of a key set hierarchy in the key management server of FIG. 1 including key sets of shared keys or associated keys of replicated storage objects.

FIG. 12 shows that the key sets 68 are organized in a hierarchy. The root 141 of the hierarchy serves as an entry point to a list 142 of the key sets. Each key set includes a respective lineage of descendants from a common ancestor object. For example, each source object having replicas has a key set family 143, 144, 145 including itself (the parent object) and its children. Thus, the key set family 143 of object ID_1 includes a list 146 of storage objects replicated from object ID-1; the key set family 144 of object ID_3 includes a list 147 of objects replicated from object ID_3; and the key set family 145 of object ID_5 includes a list 148 of objects replicated from object ID_5.

A child object of a key set family may itself be the parent of its own key set family. In FIG. 12, for example, object ID_4 is a child of object ID_3 and has its own key set family 149 including a list 151 of objects replicated from object ID_4. Object ID_7 also is a child of object ID_3 and has its own key set family 150 including a list 152 of objects replicated from object ID_7.

FIG. 13 shows that in a specific implementation, the key sets 68 are defined by a table of records including a unique respective record for each replicated encrypted storage object and for each replica of an encrypted storage object in the storage area network. Each record includes a field for a pointer to a key store entry of the replica, a field for a pointer to a parent record in the key sets 68 (or to the root of the key set hierarchy if the record is for a source storage object that has been replicated but is not itself a destination storage object), a field for a pointer to a prior sibling object (if the storage object has any prior siblings replicated from a common parent object), a field for a pointer to a next sibling (if the storage object has any next sibling replicated from a common parent object), a pointer to a first child (if the object itself is a source storage object for a replication) and a pointer to a last child (if the object itself is a source storage object for a replication), and a field for replication status.

For example, for a replica of a "read-only" source storage object or a synchronous copy of a "read-write" source object, the replication status indicates whether or not the replica is a synchronous copy presently being created or out-of-sync, synchronized with its parent or source storage object, or presently is corrupt. If a replica is a replica of a "read-only" source storage object, it may be possible to recover specific data blocks or tracks that have already been replicated or are in sync, as indicated by a block map or track table in a storage processor of the storage system storing the replica. For a replica of a "read-write" source object that is not a synchronous copy, the replication status may indicate whether or not the replica is corrupt or if it is an asynchronous copy or a snapshot copy. If the replica is a snapshot copy or an asynchronous copy, the "replication status" field may include a modification time stamp indicating when the snapshot copy was taken from or last in sync with the source storage object.

Figure 14:
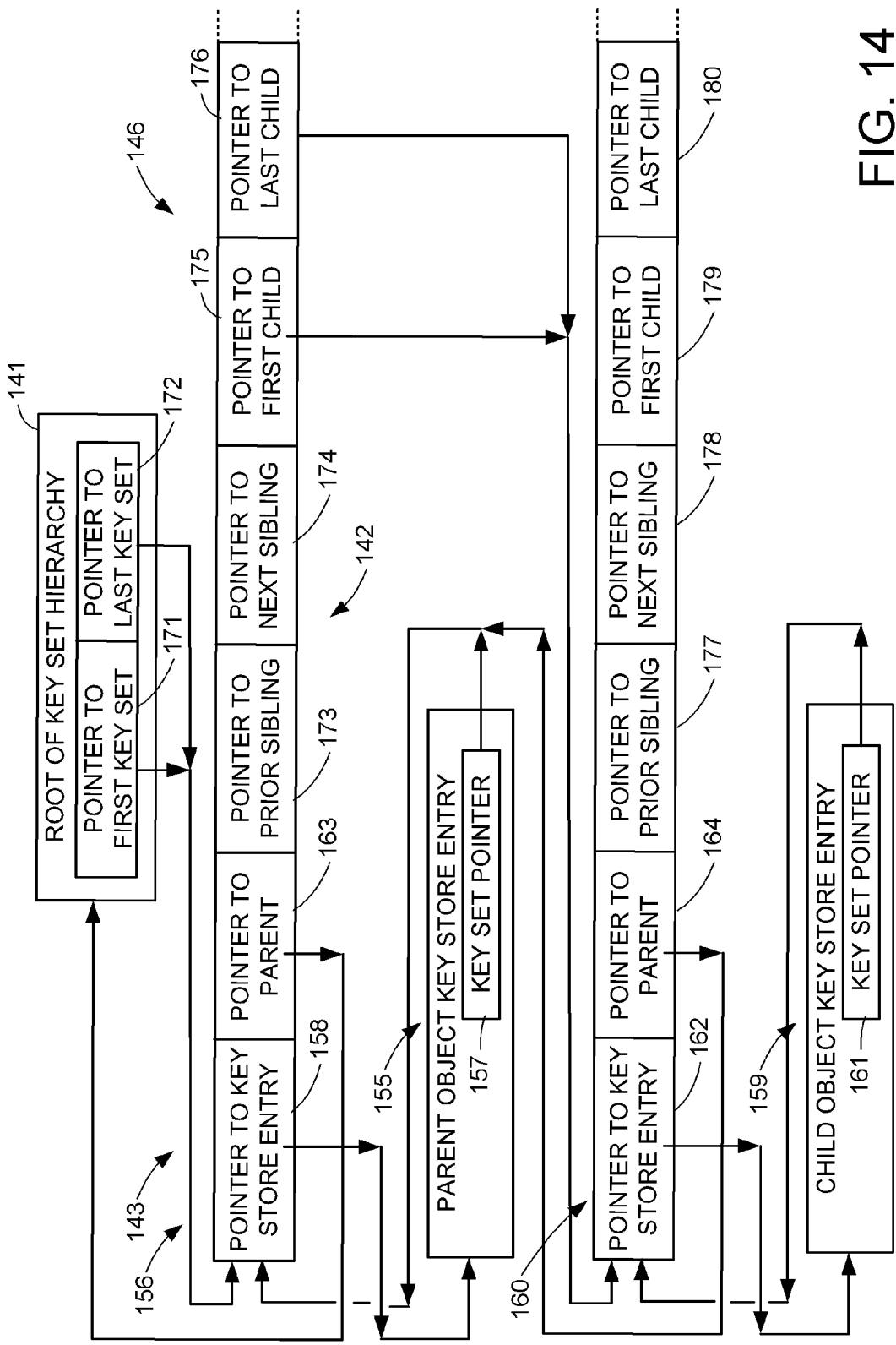
FIG. 14 is a block diagram showing links for an initial key set in the key set hierarchy using specific implementation of FIG. 13.

FIG. 14 shows links for an initial key set in the key set hierarchy using the specific implementation of FIG. 13. At this time, the key store has a record 155 for the object ID_1 and a record 160 for a first replica of the object ID_1, and the key set hierarchy has a record 156 for the object ID_1 and a record 160 for the first replica of object ID_1. The key set family 143 of object ID_1 includes the record 156 in the key set hierarchy for the object ID_1, and the record 160 in the key set hierarchy for the first replica of object ID_1. The record 156 is linked to the record 155 in the key store by a key set pointer 157 in the record 155, and by a pointer 158 to the key store entry in the record 156. The record 156 also has a pointer to parent 163. The record 160 is linked to the record 159 in the key store by a key set pointer 161 in the record 159 and by a pointer 162 to the key store entry in the record 160. The record 160 also has a pointer to parent 164. The list of key sets 142 at this time includes a pointer 171 in the root 141 pointing to the first key set (i.e., pointing to the record 156 in the table of key sets) and a pointer 172 in the root 141 also pointing to this first key set. Because there is only one key set at this time, the pointer 173 to prior sibling and the pointer 174 to next sibling are null at this time. The parent object (object ID_1) has one child at this time, so that the list 146 of object objects replicated from this parent object includes the single child object represented by the key set record 160. Thus, the list 146 of objects replicated from the parent object includes a pointer 175 to the first child and a pointer 176 to the last child, and each of these pointers points to the single child object record 160. At this time, in the child object 160, the pointer 177 to prior sibling is null, the pointer 178 to next sibling is null, the pointer 179 to first child is null, and the pointer 180 to last child is null.

Figure 15:
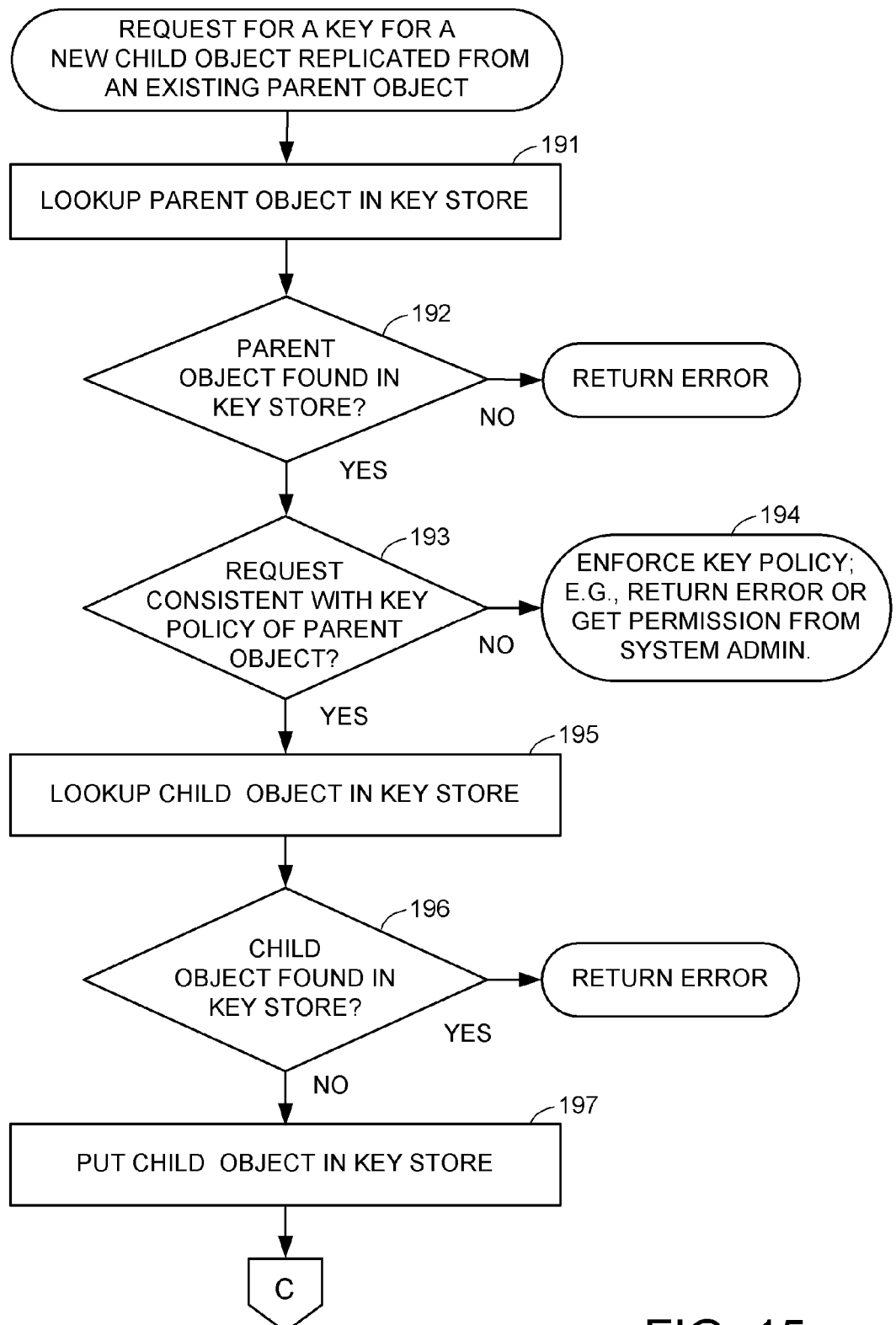
FIGS. 15, 16, and 17 together comprise a flowchart of a program routine of the key management server for responding to a key management client request for a data encryption key for a new child object to be replicated from an existing parent object.
Figure 16:
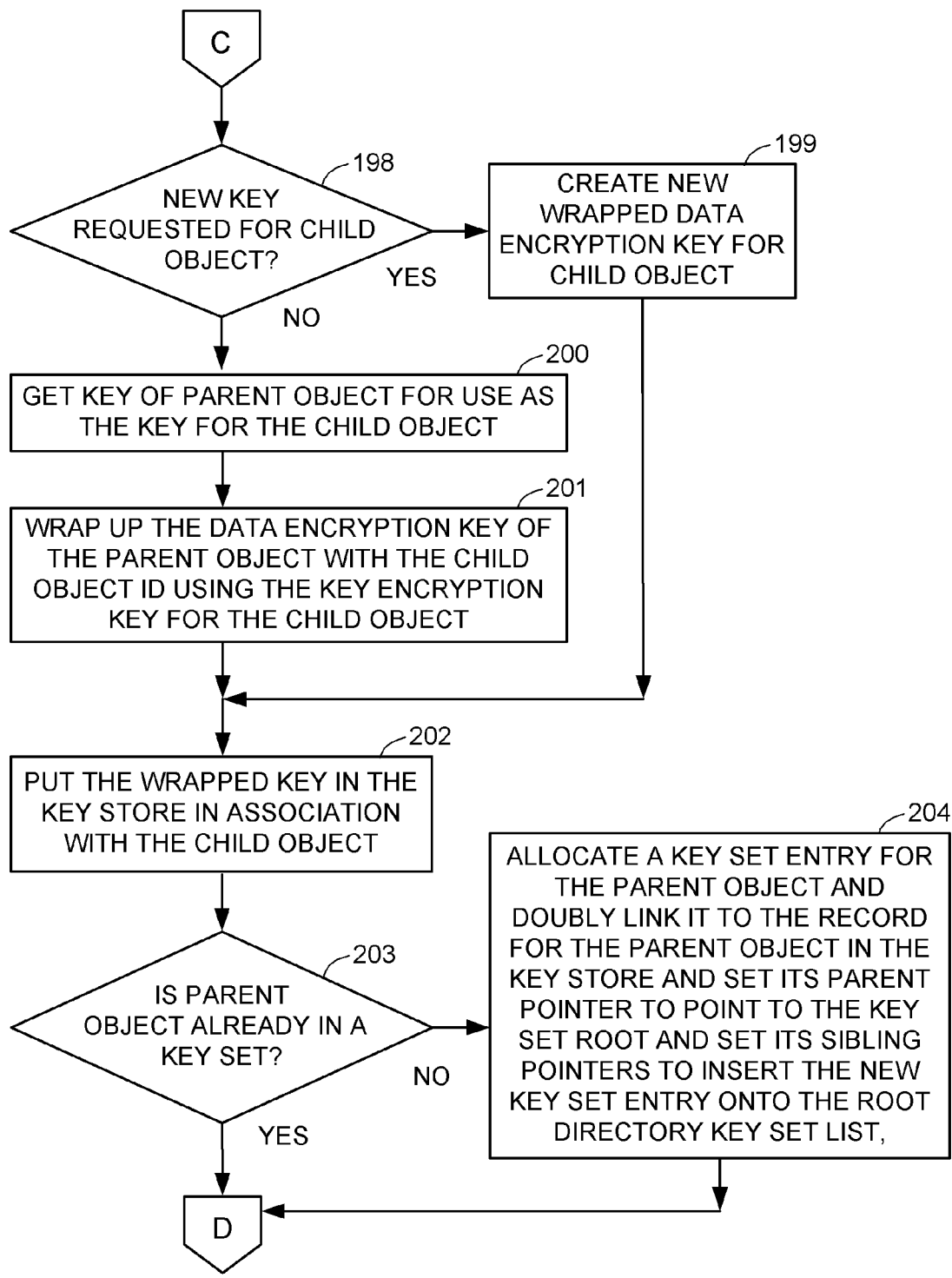
Figure 17:
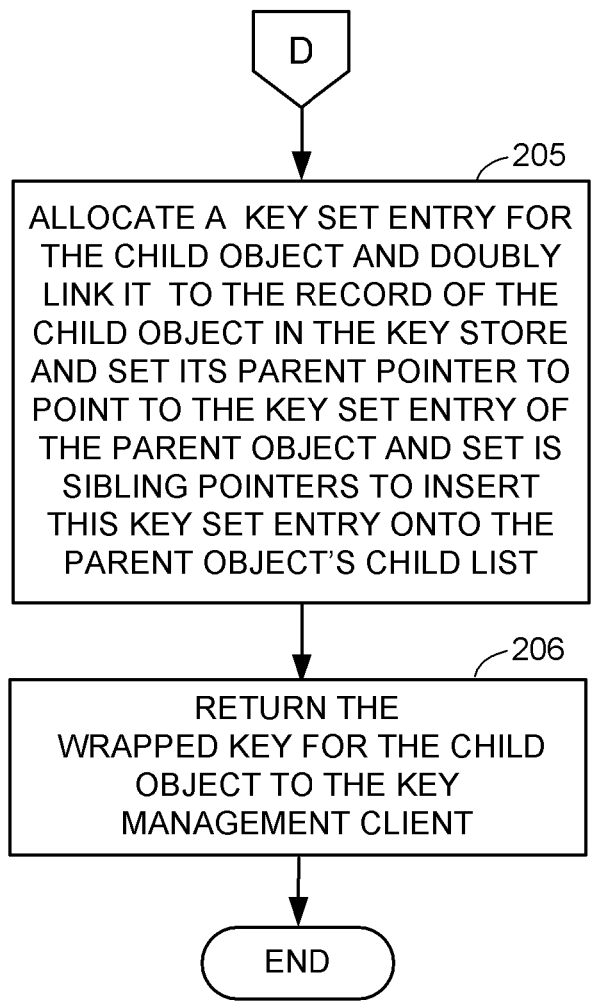

FIGS. 15, 16, and 17 show a program routine of the key management server for responding to a key management client request for a data encryption key for a new child object to be replicated from a specified parent object. In a first step 191, the key management server looks up the specified parent object in the key store. In step 192, if the parent object is not found in the key store, then the key management server returns an error to the key management client. Otherwise, execution continues to step 193.

In step 193, the key server checks whether the request from the key management client is consistent with the key policy of the parent object. For example, in the key store, the key policy for a storage object may specify that the key of the storage object is to be used for all children of that storage object, or the key policy may specify that a new key is to be used for all children of the storage object. If the request from the key management client is not consistent with the key policy of the parent object, then execution branches from step 193 to step 194 to enforce the key policy. For example, the key management server enforces the key policy by returning an error to the key management client, or by requesting permission from the system administrator to disregard the key policy.

In step 193, if the request from the key management client is consistent with the key policy of the parent object, then execution continues to step 195. In step 195, the key management server looks up the child object in the key store. In step 196, if the key management server finds the child object in the key store, then the key management server returns an error to the key management client, because the child object is supposed to be a new storage object. Otherwise, if the child object is not found in the key store, then execution continues to step 197. In step 197, the key management server puts a new record for the child object into the key store. Execution continues from step 197 to step 198 in FIG. 16.

In step 198 in FIG. 16, if the key management client is requesting a new data encryption key for the child object, then execution branches to step 199. In step 199, the key management server creates or gets a new wrapped data encryption key for the child object, and execution continues to step 202.

In step 198, if the key management client is not requesting a new data encryption key for the child object (because the key management client is requesting the data encryption key of the parent object to be shared with the child object), then execution continues from step 198 to step 200. In step 200, the key management server gets the data encryption key of the parent object for use as the data encryption key of the child object. In step 201, the key management server wraps up the data encryption key of the parent object with the child object ID using the key encryption key for the child object. Execution continues from step 201 to step 202.

In step 202, the key management server puts the wrapped key in the key store in association with the child object. In step 203, if the parent object is not already in the key set store, then execution branches to step 204. In step 204, the key management server allocates a new key set entry and doubly links it to the parent object and sets its parent pointer to point to the key set root and sets its sibling pointers to insert the new key set entry onto the root directory key set list. From step 204, execution continues to step 205 of FIG. 17. Execution also continues to step 205 of FIG. 17 from step 203 if the parent object already is in a key set.

In step 205 of FIG. 17, the key management server allocates a key set entry for the child object and doubly links it to the record of the child object in the key store and sets its parent pointer to point to the key set entry of the parent object and sets its sibling pointers to insert this key set entry onto the parent object's child list. In step 206, the key management server returns the wrapped key for the child object to the key management client, and the procedure is finished.

Figure 18:
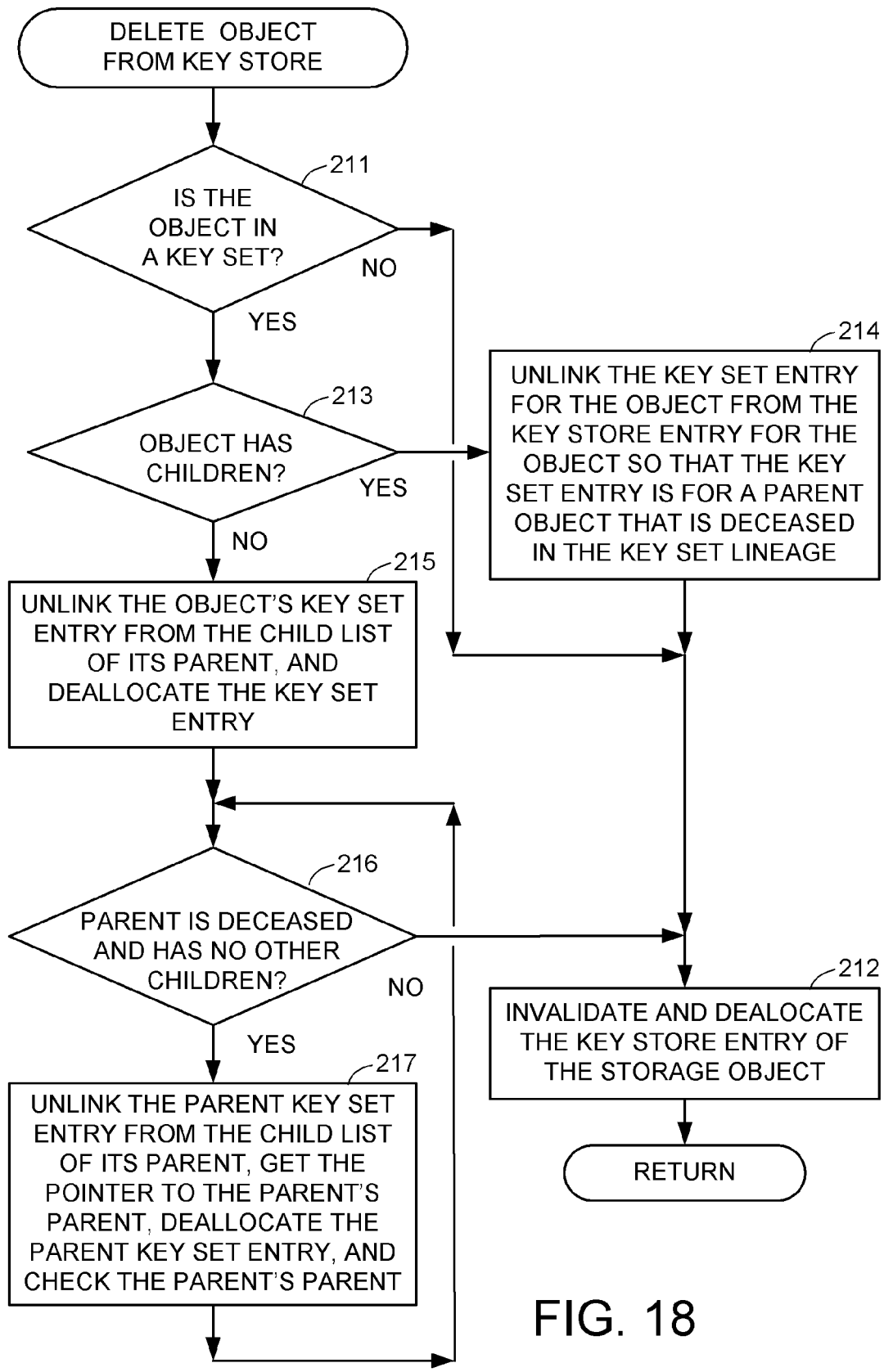
FIG. 18 a flowchart of a program routine of the key management server for deleting a key store entry for a storage object.

FIG. 18 shows a program routine of the key management server for deleting a key store entry for a specified storage object. In a first step 211, if the storage object is not in a key set (as indicated by a null key set pointer in the key set pointer field of the key store record for the storage object), then execution branches to step 212. In step 212, the key management server invalidates and deallocates the key table entry of the storage object, and execution returns.

In step 211, if the storage object is in a key set, then execution continues to step 213. In step 213, if the key object has children, then execution branches to step 214. In step 214, the key management server unlinks the key set entry for the storage object from the key store entry for the storage object so that the key set entry is for a parent object that is deceased in the key set lineage. Execution continues from step 214 to step 212 to invalidate and deallocate the key store entry of the storage object, and then execution returns.

In step 213, if the storage object does not have any children, then execution continues to step 215. In step 215, the key management server unlinks the key set entry of the storage object from the child list of its parent object, and then deallocates this key set entry. In step 216, if this parent object is not deceased or the parent object has at least one other child, then execution branches to step 212 to invalidate and deallocate the key store entry of the storage object, and then execution returns. Otherwise, if this parent object is deceased and has no other children, then execution continues from step 216 to step 217. In step 217, the key management server unlinks the key set entry of the parent from the child list of its parent, gets the pointer to parent from the key set entry of the parent, deallocates the key set entry of the parent, and checks the key set entry of the parent's parent. Execution loops back to step 216 to check whether the parent's parent object is deceased and has no children. In this fashion, deletion of an object will cause deallocation of key store entries for deceased ancestors if the object being deleted is the sole surviving descendant of the deceased ancestors.

Figure 19:
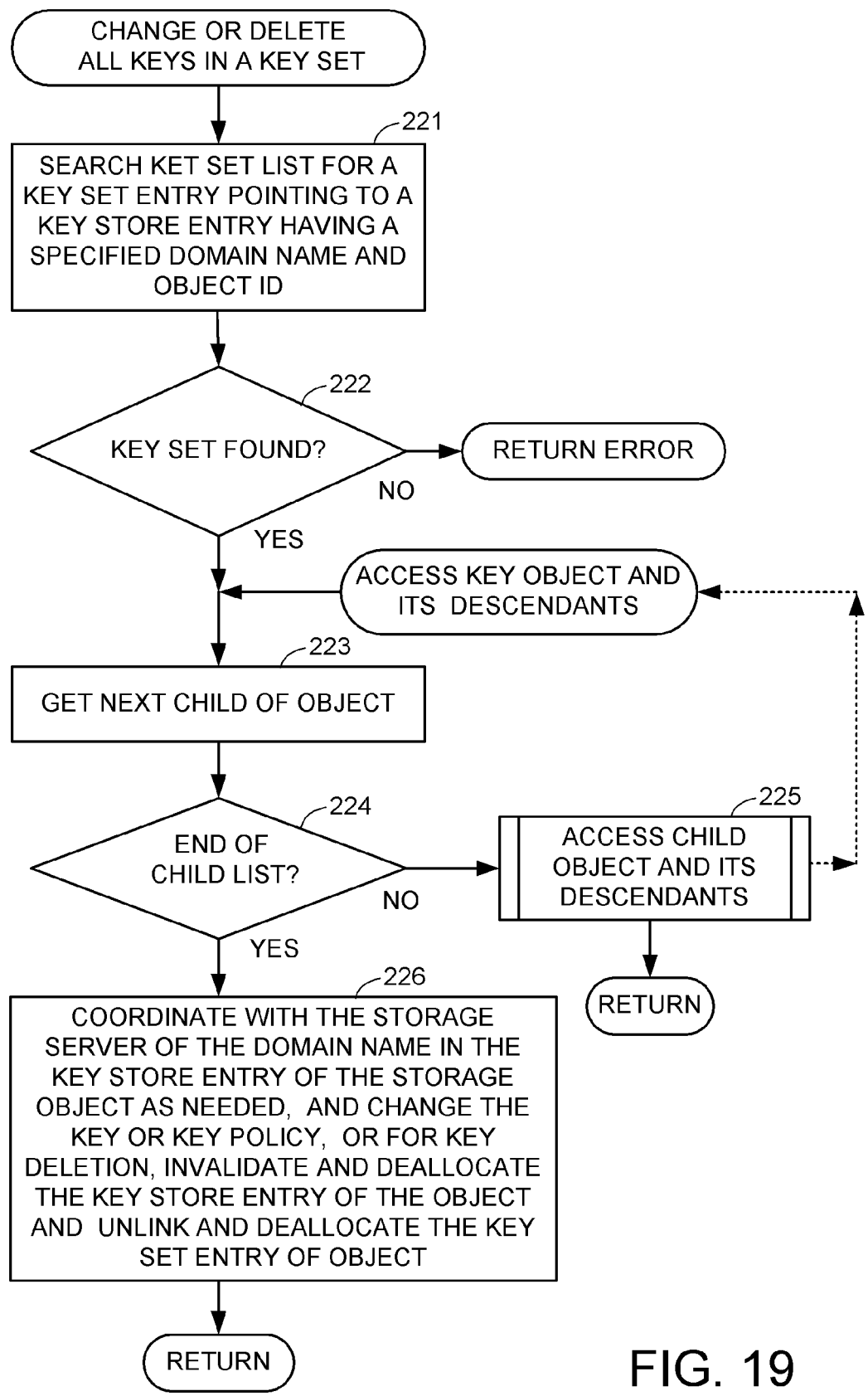
FIG. 19 is a flowchart of a program routine of the key management server for changing or deleting all key in a key set.

FIG. 19 shows a program routine of the key management server for changing or deleting all keys in a specified key set. Key deletion may require manual intervention or approval of the system administrator or another person having the role of a security officer. The key set is specified by an object ID and a domain name. In a first step 221, the key set list is searched for a key set entry pointing to a key store entry having the specified domain name and object ID. In step 222, if such a key set entry is not found, then execution returns with an error. Otherwise, execution continues from step 222 to step 223. In step 223, the key management server gets the next child of the child list of the key store entry having the specified domain name and object ID. In step 224, if the end of this child list is not reached, then execution branches to step 225 to perform a recursive call back to step 223 to access the child object and its descendants. Therefore, the key management server steps down the lineage of the key set hierarchy until, in step 226, a child object is reached that has no children. In step 226, the key management server coordinates with the storage server of the domain name in the key store entry of this storage object as needed to change the data encryption key or key policy, or for key deletion, for key deletion from the storage server of the domain name and invalidation and deallocation of the key store entry of the storage object, and for unlinking and deallocating the key set entry for the storage object. Upon returning from step 226, once all data encryption keys of an object's children have been changed or deleted, then the key for that object is changed or deleted, and so on, until all keys of all descendants of the parent of the key set have been changed or deleted, and that parent's own key is changed or deleted in step 226, until execution returns from the original call to the program routine of FIG. 19.

To facilitate the change of a specified data encryption key to a new key, the wrapped key information field in the key store entries and the key table entries may contain wrapped key information for the new data encryption key as well as the old data encryption key. For example, an encrypted storage object can be accessed by a host processor on a priority basis concurrently with the key change while an I/O module performs a background process of decrypting the storage object with the old data encryption key and re-encrypting the storage object with the new data encryption key on a track-by-track or block-by-block basis. For example, the key store entry and key table entry includes a flag indicating whether or not a key change is in progress, and if so, the storage processor has a table or list of which tracks or blocks of the storage object are presently encrypted with the old key and which tracks or blocks are presently encrypted with the new key.

The key management server can be programmed so that key store entries for a specified data encryption key or a specified key set are invalidated but not deallocated until deallocation is approved by manual intervention of the system administrator or by a security officer. For example, if circumstances arise suggesting that a data encryption key has been compromised or a storage object has been corrupted, the key store entries of the objects using the suspect key or the suspect storage object and all of its descendants in the key set hierarchy are marked as invalid and/or in need of storage management action, and in a similar fashion the suspect keys or suspect storage objects marked as invalid in the key store can be marked as invalid and/or in need of storage management action in the key tables of the storage systems storing the objects. If the system administrator or security officer later find that the suspect keys or suspect storage objects are not compromised or have not been corrupted, then the system administrator may change the status of these entries back to valid instead of deleting them.

The key management server may also be programmed to recognize a request from a key management client to disassociate a child object from its parent object, without invalidating or deleting the key store entry for the child object. For example, a host processor may want to begin using a read-only replica as a read-write object, in which case the read-write object would no longer be a copy of its parent object. The key management server may handle such a request in a fashion similar to a request to delete the storage object by unlinking the key store entry from the key set hierarchy, and possibly marking the entry in the key set hierarchy for the storage object as "deceased," without invalidating or deleting the key store entry for the storage object. However, if the data encryption key of the replica to be disassociated from its parent object is shared with its parent object, the key management server may require a change of the data encryption key of the replica to a new unique data encryption key issued to the replica in accordance with a policy of sharing data encryption keys among storage objects only when the storage objects contain the same data.

The key management server also recognize query commands for searching the key set hierarchy for a specified storage object ID, a specified storage object ID in a specified domain namespace, or a specified data encryption key UUID. The search down the hierarchy is performed in a fashion similar to the procedure in FIG. 19. The query command may request the search to stop once a particular entry in the key set hierarchy is found, or the query command may request identification of all possible entries in the key hierarchy that satisfy the search criterion. If the search stops at a particular entry in the key set hierarchy, then the search down the hierarchy may be restarted from that entry using the same search criteria or different search criteria. For example the system administrator or a storage management application may query for all possible locations of replicas on the storage area network for shredding purposes after a migration, for identification purposes when performing data classification, and for recovery or policy purposes when locating specific data.

Figure 20:
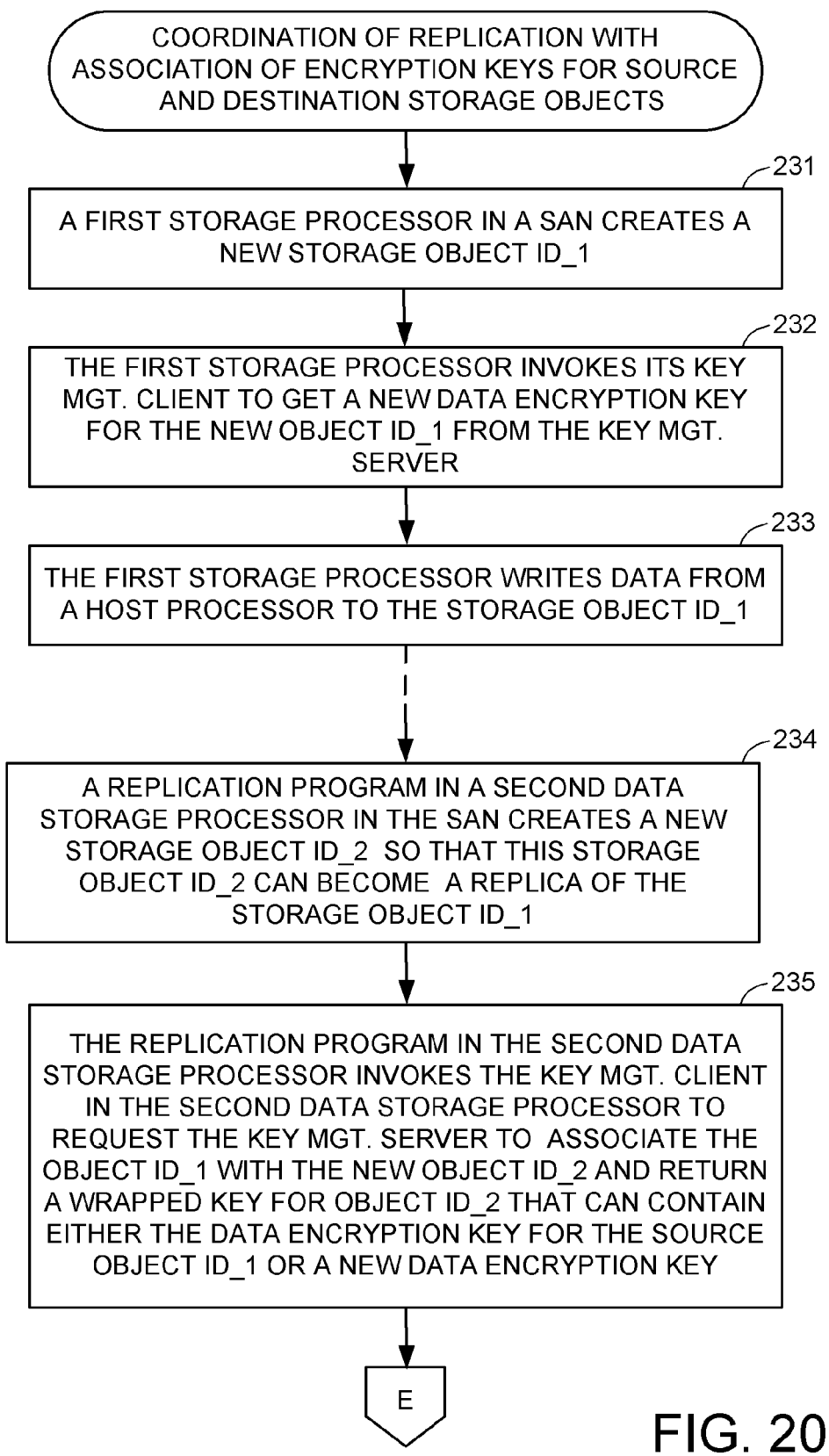
FIGS. 20 and 21 together comprise a flowchart of a method of coordination of replication with association of data encryption keys for source and destination storage objects in the storage area network of FIG. 1.
Figure 21:
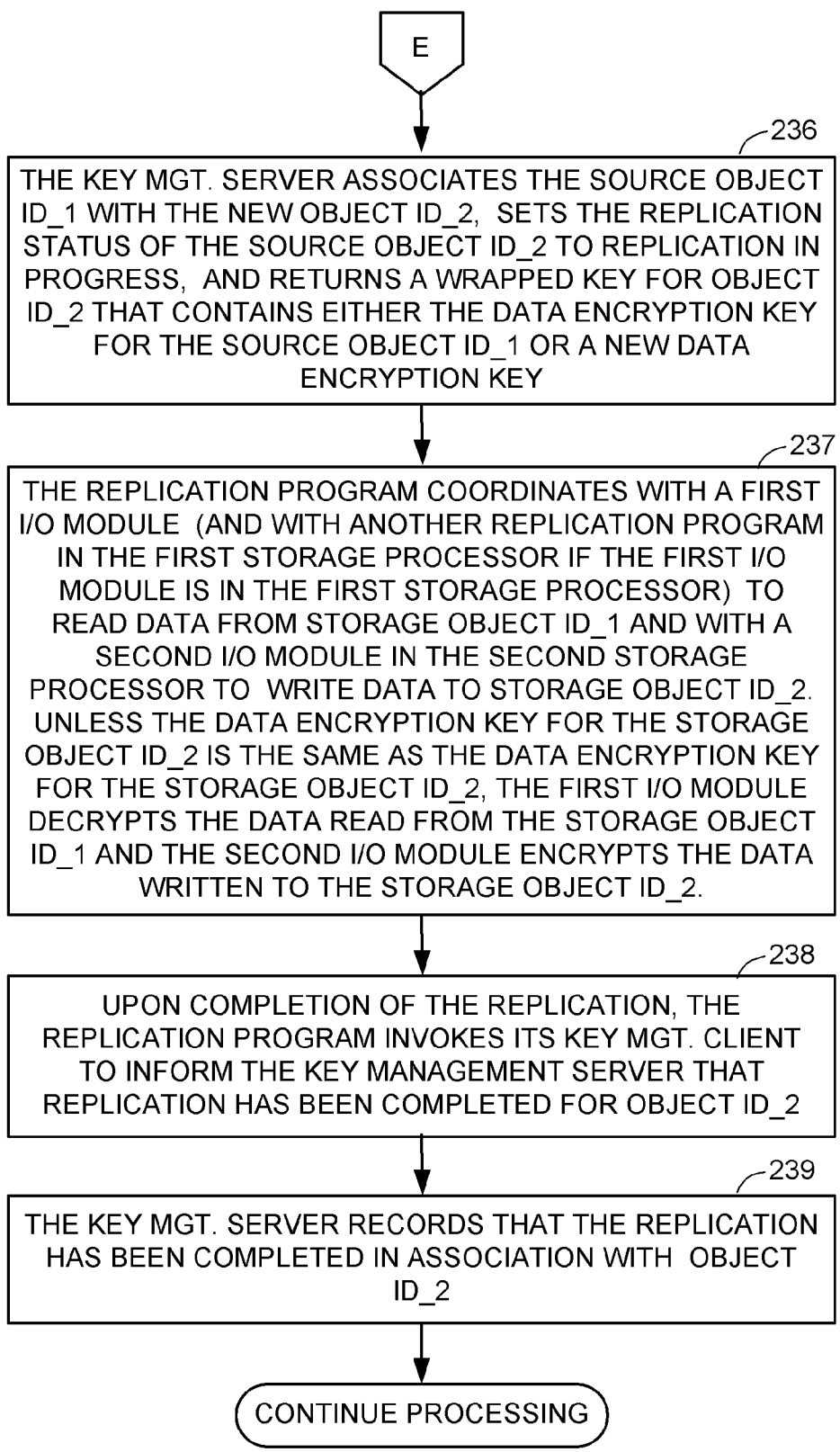

FIGS. 20 and 21 show a method of coordination of replication with association of data encryption keys for source and destination storage objects in the storage area network of FIG. 1. This method automates the selection of a data encryption key for a new destination storage object to become a local or remote copy of a selected source storage object, the association of the destination storage object and its data encryption key with the source storage object, and the search for a replica of the source storage object for recovery from a failure of the source storage object. Therefore, it is not necessary for the system administrator to understand the replication strategy for various storage objects in the storage area network or to keep track of the device and server mapping for the replicas. The key management server provides a centralized location for keeping track of replicas in the same storage system or in different storage systems as well as keeping track of the data encryption keys for the storage objects and their replicas.

In a first step 231 of FIG. 20, a first storage processor in the storage area network (SAN) creates a new storage object ID_1. For example, the new storage object ID_1 is the storage of the disk drive 33 in the RAID set 40 in FIG. 1. Then, in step 232, the first storage processor invokes its key management client to get a new data encryption key for the new object ID_1 from the key management server. In step 233, the first storage processor writes data from a host processor to the storage object ID_1. Some time later, in step 234, a replication program in a second data storage processor in the storage area network (SAN) creates a new storage object ID_2 so that the new storage object ID_2 can become a replica of the storage object ID_1. For example, the new storage object ID_2 is the storage of the disk drive 37 in the RAID set 41 in FIG. 1. In step 235, the replication program in the second data storage processor invokes the key management client in the second data storage processor to request the key management server to associate the existing storage object ID_1 with the new storage object ID_2 and return a wrapped key for the storage object ID_2 that can contain either the data encryption key for the storage object ID_1 or a new data encryption key. Execution continues from step 235 to step 236 in FIG. 21.

In step 236 of FIG. 21, the key management server associates the source storage object ID_1 with the new storage object ID_2 and sets the replication status of the new object ID_2 to "replication in progress" and returns a wrapped key for the storage object ID_2 that contains either the data encryption key for the source object ID_1 or a new data encryption key. In step 237, the replication program coordinates with a first I/O module (and with another replication program in the first storage processor if the first I/O module is in the first storage processor) to read data from the from the source storage object ID_1 and write the data to the destination storage object ID_2. If the data encryption key for the destination storage object ID_2 is the same as the data encryption key for the source storage object ID_1, then the first I/O module streams encrypted data read from the source storage object ID_1 to the second I/O module and the second I/O module writes this encrypted data to the destination object ID_2. If the data encryption key for the destination storage object ID_2 is different from the data encryption key for the source storage object ID_1, then the first I/O module decrypts the data read from the source storage object ID_1 using the data encryption key for the source storage object ID_1, streams this decrypted data to the second I/O module, and the second I/O module encrypts this data using the data encryption key for the destination object ID_2, and writes this encrypted data into the destination storage object ID_2.

In step 238, upon completion of the replication from the source storage object ID_1 to the destination storage object ID_2, the replication program invokes its key management client to inform the key management server that replication has been completed for the destination object ID_2. In step 239, the key management server responds by recording that the replication has been completed in association with the destination storage object ID_2. For example, the key management server updates the replication status field of a record for the destination storage object ID_2 in the key set data structure to indicate that the replication has been finished for the destination storage object ID_2.

Figure 22:
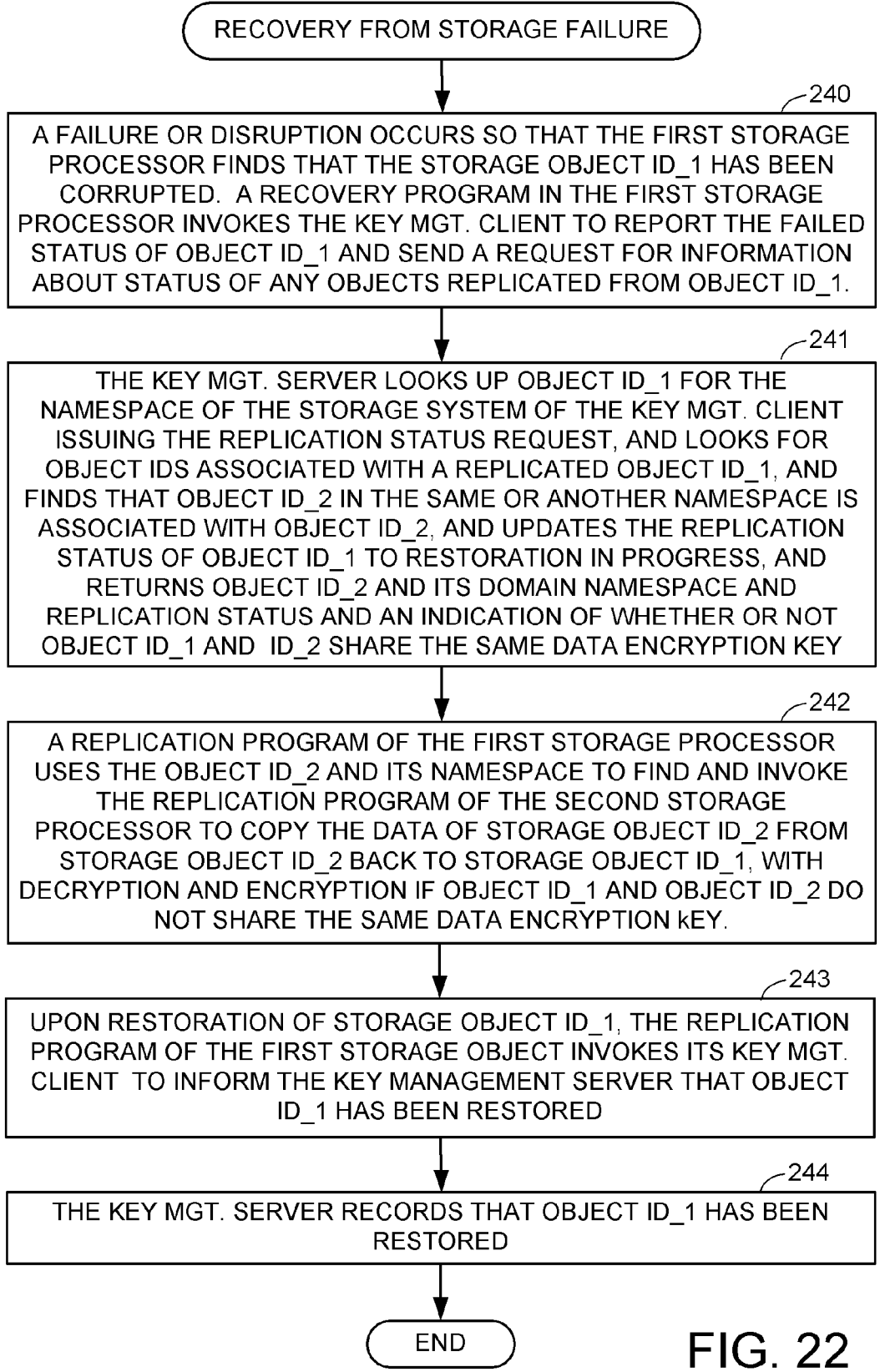
FIG. 22 is a flowchart of a method of recovery from storage failure in the storage area network of FIG. 1.

FIG. 22 shows a method of recovery from storage failure in the storage area network of FIG. 1. In a first step 240, a failure or disruption occurs so that the first storage processor finds that the storage object having object ID_1 has been corrupted. In response, a recovery program in the first storage processor invokes the key management client to report the failed status of the object ID_1 and to send a request to the key management server for information about the status of any objects replicated from object ID_1. In step 241, the key management server looks up the object ID_1 for the domain namespace of the storage system of the key management client issuing the replication status request. In this example, the key management server finds that a storage object ID_2 in the same or another domain namespace is associated with the storage object ID_2 in the key set hierarchy. The key management server updates the replication status of the storage object ID_1 to "restoration in progress" in the entry for object ID_1 in the key set hierarchy, and the key management server returns the storage object ID_2 and its domain namespace and replication status to the key management client. The key management server may also return an indication of whether or not object ID_1 and object ID_2 share the same data encryption key.

In step 242, a replication program of the first storage processor checks the replication status of the storage object ID_2 and finds that the storage object ID_2 is suitable for restoration of the storage object ID_1. Therefore, the replication program of the first storage processor uses the object ID_2 and its namespace to find and invoke the replication program of the second storage processor to copy the data of the storage object ID_2 from the storage object ID_2 back to the storage object ID_1. If object ID_1 and object ID_2 do not share the same data encryption key, then the data read from object ID_2 is decrypted with the data encryption key of object ID_2, and this decrypted data is encrypted with the data encryption key of object ID_1 and this encrypted data is written into the storage object ID_1 in order to restore the storage object ID_1. In step 243, upon restoration of the storage object ID_1, the replication program of the first storage object invokes its key management client to inform the key management server that the storage object ID_1 has been restored. In step 244, the key management server updates the replication status of the entry of the storage object ID_1 in the key set data structure to set the replication status to "restored."

In view of the above, there has been described a method and system for automation of coordination of encryption keys in a SAN based environment where an encryption engine, device management, and key management are not co-located. A key management server in a storage area network provides encryption keys for source and destination storage objects and also associates destination storage objects with encrypted source storage objects. When an encrypted source object is to be replicated, a replication facility in a storage system of a new destination object requests the key management server to associate the destination object with the source object and assign the data encryption key of the source object or a new data encryption key to the destination object. For recovery of the source object, a replication facility in the storage system of the source object obtains information from the key management server about the replica associated with the source object for replicating data from the destination object back to the source object. The replication can occur locally for the case where the source object and the destination object are in storage of the same storage system, or the replication can occur remotely for the case where the source object and the destination object are in different storage systems.

In a preferred implementation, the key management server also keeps track of replication status of the associated source and destination storage objects. A replication facility can ask the key management server whether replication for a destination object is ongoing or has been completed, or whether restoration of a source object is ongoing or has been completed. Thus, a replication facility can recover from a failure to access an encrypted storage object having at least one replica by requesting the key management server to identify and provide the key information and replication status of any suitable replicas that may provide data for restoration of the failed storage object. If a replica is found that is a complete copy of the failed storage object, then the identity and the key information of that replica can be used for fully restoring the failed storage object. The key information can be inspected to determine whether or not that replica and the failed storage object use the same data encryption key or whether they use different data encryption keys, in order to coordinate the decryption and encryption of the data copied from the replica to the failed storage object for the case where that replica and the failed storage object use different data encryption keys.

What is claimed is:

1. A method of operation in a data processing system including a storage area network, a storage system computer, and a key management server computer separate from the storage system computer, the storage area network including data storage devices, and the storage system computer including a replication facility and an encryption engine separate from the data storage devices, and the key management server computer providing encryption keys to the encryption engine, said method comprising:
   a) the storage system computer creating an encrypted storage object in the storage area network, and the storage system computer sending a first request to the key management server computer for a data encryption key for writing encrypted data into the storage object, and the key management server computer responding to the first request by assigning a data encryption key to the storage object and keeping a record of the data encryption key assigned to the storage object;
   b) the storage system computer creating a replica of the storage object in the storage area network, and the storage system computer sending a second request to the key management server computer for a data encryption key for the replica to be associated in the key management server, and the key management server computer responding to the second request by assigning a data encryption key to the replica in coordination with the replication facility independent of the encryption engine, and the key management server computer keeping a record of the data encryption key assigned to the replica and an association of the replica with the storage object; and
   c) the storage system computer responding to a failure of the storage object in the storage area network by obtaining from the key management server computer an identification of the replica of the storage object that is associated with the storage object, and using the identification of the replica from the key management server computer to find the replica in the storage area network, and using the replica found in the storage area network to recover from the failure of the storage object.

2. The method as claimed in claim 1, which further includes the storage system computer using the replica to recover from the failure of the storage object by restoring the storage object with data read from the replica.

3. The method as claimed in claim 2, which further includes the key management server computer providing an indication of whether or not the data encryption key of the replica is the same as the data encryption key of the storage object, and in response to the key management server computer indicating that the data encryption key of the of the replica is the same as the data encryption key of the storage object, the storage system computer using the data read from the replica to restore the storage object by writing the data read from the replica into the storage object.

4. The method as claimed in claim 2, which further includes the key management server computer providing an indication of whether or not the data encryption key of the replica is the same as the data encryption key of the storage object, and in response to the key management server computer indicating that the data encryption key of the of the replica is not the same as the data encryption key of the storage object, the storage system computer using the data read from the replica to restore the storage object by decrypting the data read from the replica with the data encryption key of the replica to produce decrypted data and encrypting the decrypted data with the data encryption key of the storage object to produce encrypted data written to the storage object.

5. The method as claimed in claim 2, which further includes the key management server computer keeping an indication of restoration status of the storage object, the restoration status indicating whether or not restoration of the storage object is in progress or has been completed.

6. The method as claimed in claim 1, which further includes the key management server computer keeping an indication of replication status of the replica, the replication status indicating whether or not replication from the storage object to the replica is in progress or has been completed.

7. The method as claimed in claim 1, wherein the method further includes a first storage processor in the storage area network requesting the data encryption key of the storage object from the key management server computer for writing encrypted data into the storage object, and a second storage processor in the storage area network requesting the data encryption key of the replica to be associated in the key management server computer.

8. A method of operating a data processing system including at least one host processor, at least one storage system computer coupled to said at least one host processor for storing data of said at least one host processor, and at least one key management server computer coupled to and separate from said at least one storage system computer for providing data encryption keys to said at least one storage system computer, said method comprising:
   (a) the key management server computer providing a data encryption key to said at least one storage system computer for encrypting data to be written to a source storage object in data storage of said at least one storage system computer, and the key management server computer keeping a record of the source storage object and the data encryption key for the source storage object; and then
   (b) said at least one storage system computer using the data encryption key for encrypting data to be written to the source storage object by encrypting data from said at least one host processor and writing the encrypted data to the source storage object in the data storage; and then
   (c) the key management server computer providing a data encryption key to said at least one storage system for decrypting data read from the source storage object and written to a destination storage object in the data storage of said at least one storage system, and the key management server computer keeping a record of the destination storage object and the data encryption key for the destination storage object and keeping an association of the record of the destination storage object with the record of the source storage object; and then
   (d) said at least one storage system computer responding to a failure of the source storage object by sending a request to the key management server computer, the request specifying the source storage object and requesting the key management server computer to identify any storage object associated with the specified storage object; and in response to the request, the key management server computer finding that the record of the destination storage object is associated with the record of the specified source storage object, and returning a reply to said at least one storage system, the reply identifying the destination storage object; and
   (e) said at least one storage system computer responding to the reply from the key management server computer by reading data from the destination storage object identified by the reply, and using the data read from the destination storage object identified by the reply to recover from the failure of the source storage object; and (f) said at least one storage system computer using the data read from the destination storage object identified by the reply to recover from the failure of the source storage object by restoring the source storage object with the data read from the destination storage object identified by the reply; and (g) the key management server computer keeping an indication of the restoration status of the source storage object, the restoration status indicating whether or not restoration of the source storage object is in progress or has been completed.

9. The method as claimed in claim 8, wherein the reply includes an indication of whether or not the data encryption key of the destination storage object is the same as the data encryption key of the source storage object, and the method further includes said at least one storage system computer inspecting the reply and finding that the reply indicates that the data encryption key of the destination storage object is the same as the data encryption key of the source storage object, and in response to finding that the data encryption key of the destination storage object is the same as the data encryption key of the source storage object, using the data read from the destination storage object identified by the reply to restore the source storage object by writing the data read from the destination storage object into the source storage object.

10. The method as claimed in claim 8, wherein the reply includes an indication of whether or not the data encryption key of the destination storage object is the same as the data encryption key of the source storage object, and the method further includes said at least one storage system computer inspecting the reply and finding that the reply indicates that the data encryption key of the destination storage object is not the same as the data encryption key of the source storage object, and in response to finding that the data encryption key of the destination storage object is not the same as the data encryption key of the source storage object, using the data read from the destination storage object identified by the reply to restore the source storage object by decrypting the data read from the destination storage object identified by the reply with the data encryption key of the destination storage object identified by the reply to produce decrypted data and encrypting the decrypted data with the data encryption key of the source storage object to produce encrypted data written to the source storage object.

11. The method as claimed in claim 8, which further includes the key management server computer keeping an indication of replication status of the destination storage object, the replication status indicating whether or not replication to the destination storage object is in progress or has been completed.

12. A data processing system comprising:
a storage area network including data storage devices and a storage system computer, the storage system computer including a replication facility and an encryption engine separate from the data storage devices; and
a key management server computer separate from the storage system computer and coupled to the storage area network for providing data encryption keys to the encryption engine; wherein the storage system computer is programmed for creating an encrypted storage object in the storage area network, and the storage system computer is further programmed for sending a first request to the key management server computer for a data encryption key for writing encrypted data into the storage object and the key management server computer is programmed for responding to the first request by assigning a data encryption key to the storage object and keeping a record of the data encryption key assigned to the storage object;
the storage system computer is further programmed for creating a replica of the storage object in the storage area network in coordination with the replication facility independent of the encryption engine, and the storage system computer is further programmed for sending a second request to the key management server computer for a data encryption key for the replica to be associated in the key management server, and the key management server computer is further programmed for responding to the second request by assigning a data encryption key to the replica and keeping a record of the data encryption key assigned to the replica and an association of the replica with the storage object; and the storage system computer is further programmed for responding to a failure of the storage object in the storage area network by obtaining from the key management server computer an identification of the replica of the storage object that is associated with the storage object, and using the identification of the replica from the key management server computer to find the replica in the storage area network and use the replica to recover from the failure of the storage object.

13. The data processing system as claimed in claim 12, wherein the storage system computer is further programmed for using the replica to recover from the failure of the storage object by restoring the storage object with data read from the replica.

14. The data processing system as claimed in claim 13, wherein the key management server computer is further programmed for providing an indication of whether or not the data encryption key of the replica is the same as the data encryption key of the storage object, and the storage system computer is further programmed to respond to the key management server computer indicating that the data encryption key of the replica is the same as the data encryption key of the storage object by using the data read from the replica to restore the storage object by writing the data read from the replica into the storage object.

15. The data processing system as claimed in claim 13, wherein the key management server computer is further programmed for providing an indication of whether or not the data encryption key of the replica is the same as the data encryption key of the storage object, and the storage system computer is further programmed for responding to the key management server computer indicating that the data encryption key of the replica is not the same as the data encryption key of the storage object by using the data read from the replica to restore the storage object by decrypting the data read from the replica with the data encryption key of the replica to produce decrypted data and encrypting the decrypted data with the data encryption key of the storage object to produce encrypted data written to the storage object.

16. The data processing system as claimed in claim 13, wherein the key management server computer is further programmed for keeping an indication of restoration status of the storage object, the restoration status indicating whether or not restoration of the storage object is in progress or has been completed.

17. The data processing system as claimed in claim 12, which further includes the key management server computer keeping an indication of replication status of the replica, the replication status indicating whether or not replication from the storage object to the replica is in progress or has been completed.

18. The data processing system as claimed in claim 12, wherein the storage area network includes a plurality of host processors linked to a plurality of storage systems for storing encrypted data from the plurality of host processors in data storage of the storage systems, and a management local area network linking the storage systems to the key management server computer for transmitting data encryption keys from the key management server computer to the plurality of storage systems.

19. The data processing system as claimed in claim 18, wherein the management area network includes a management station from which a system administrator may remotely configure the storage systems, and wherein the key management server is located in a physically secure area including the management station.

* * * * *